April 23, 1968  P. L. CHAGNON ETAL  3,379,357
CONVEYING AND ORIENTING APPARATUS
Filed June 4, 1965  23 Sheets-Sheet 22
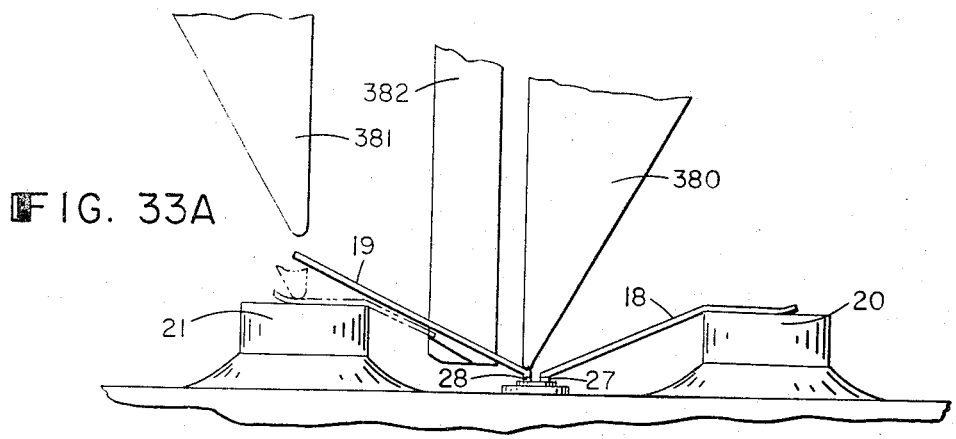
FIG. 33A
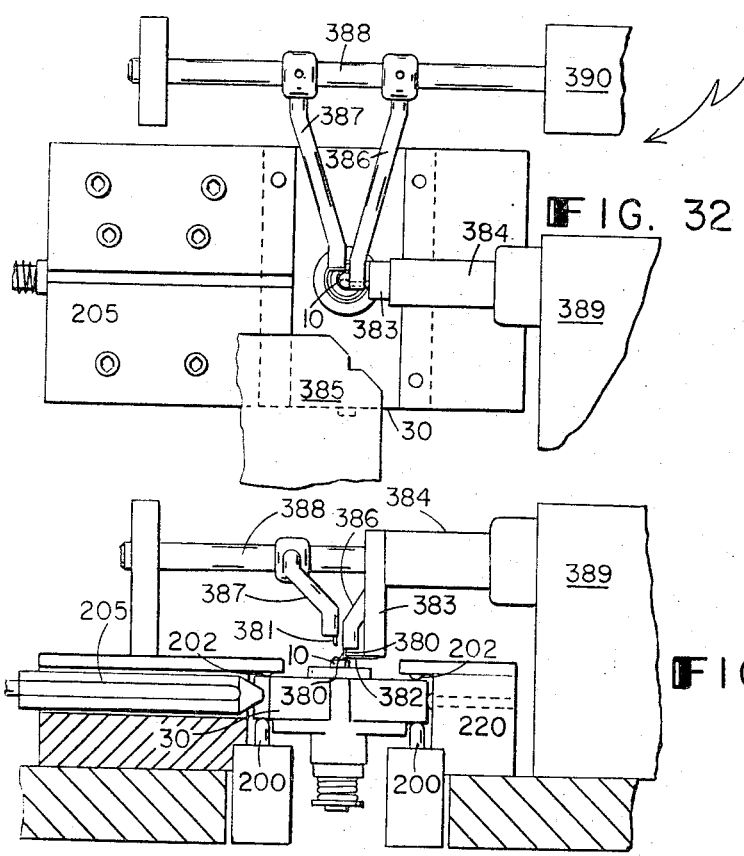
FIG. 32
FIG. 33

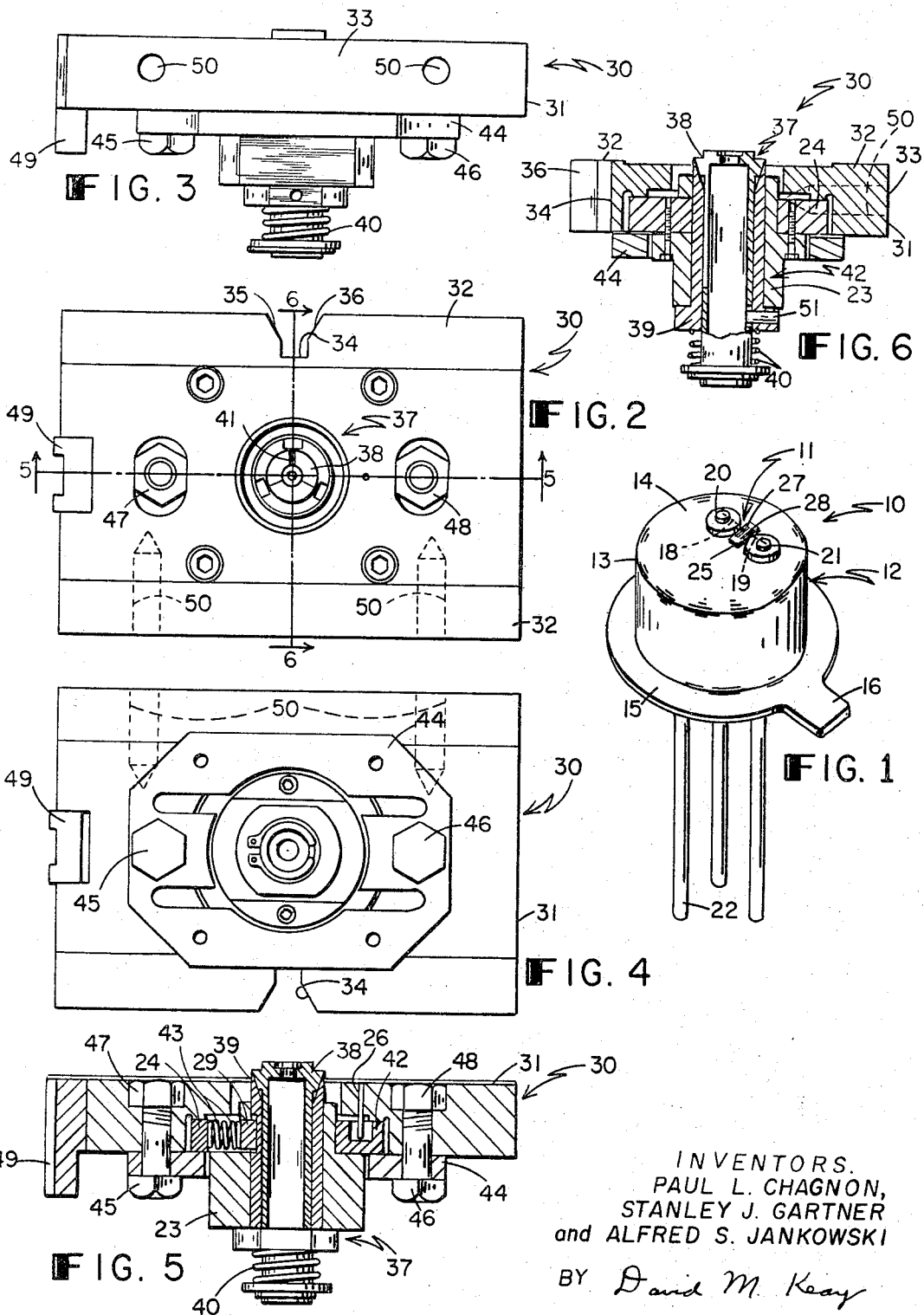

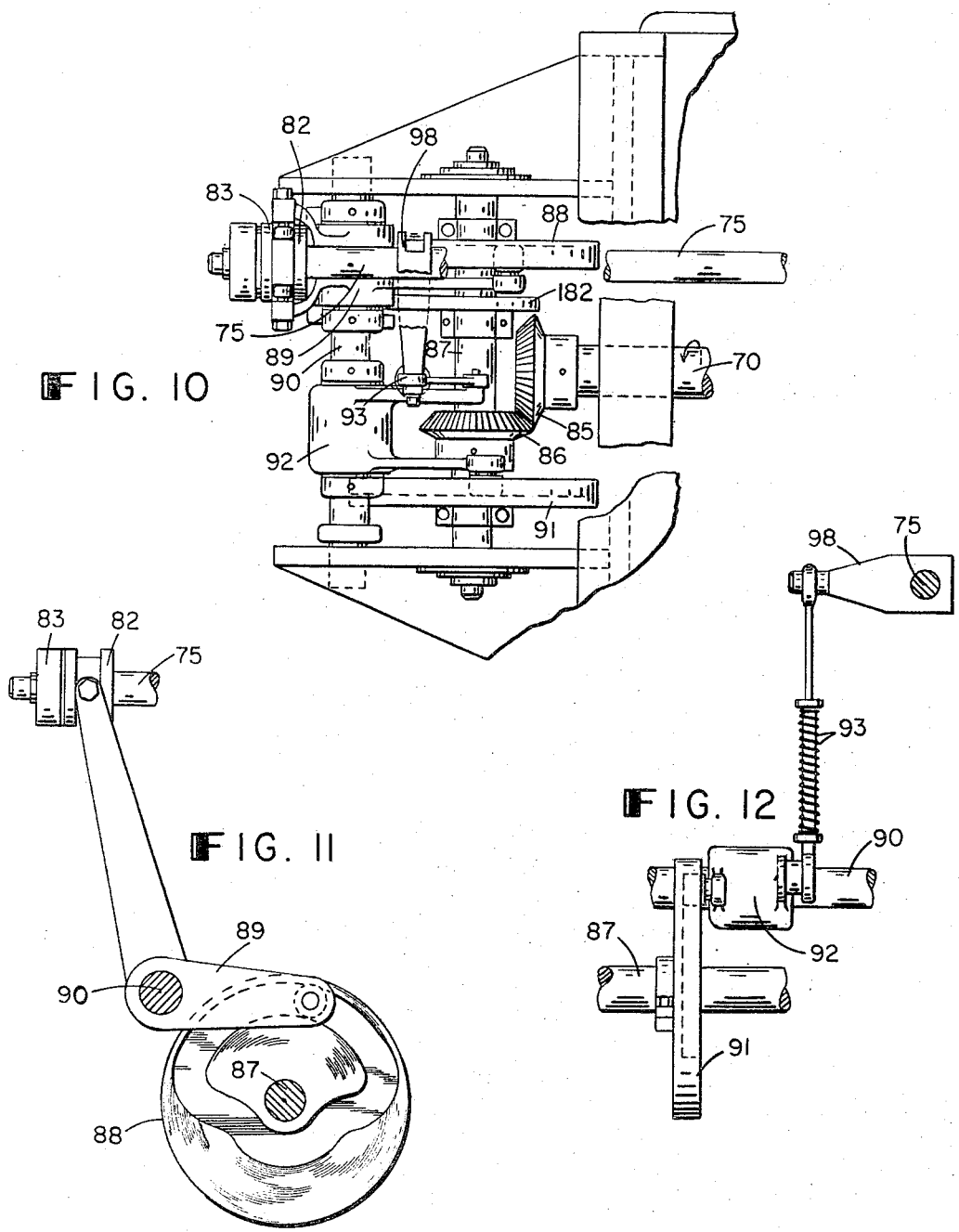

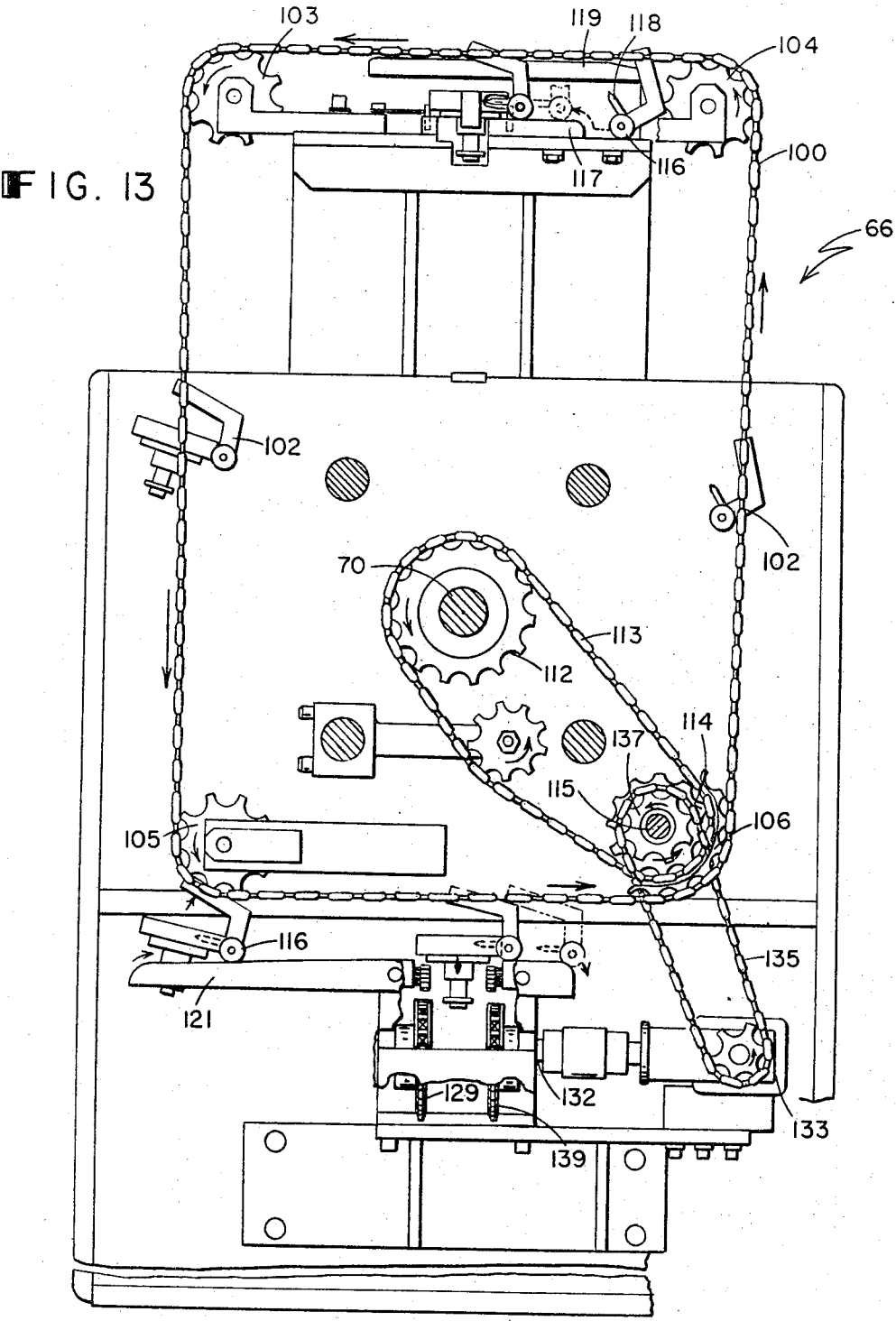

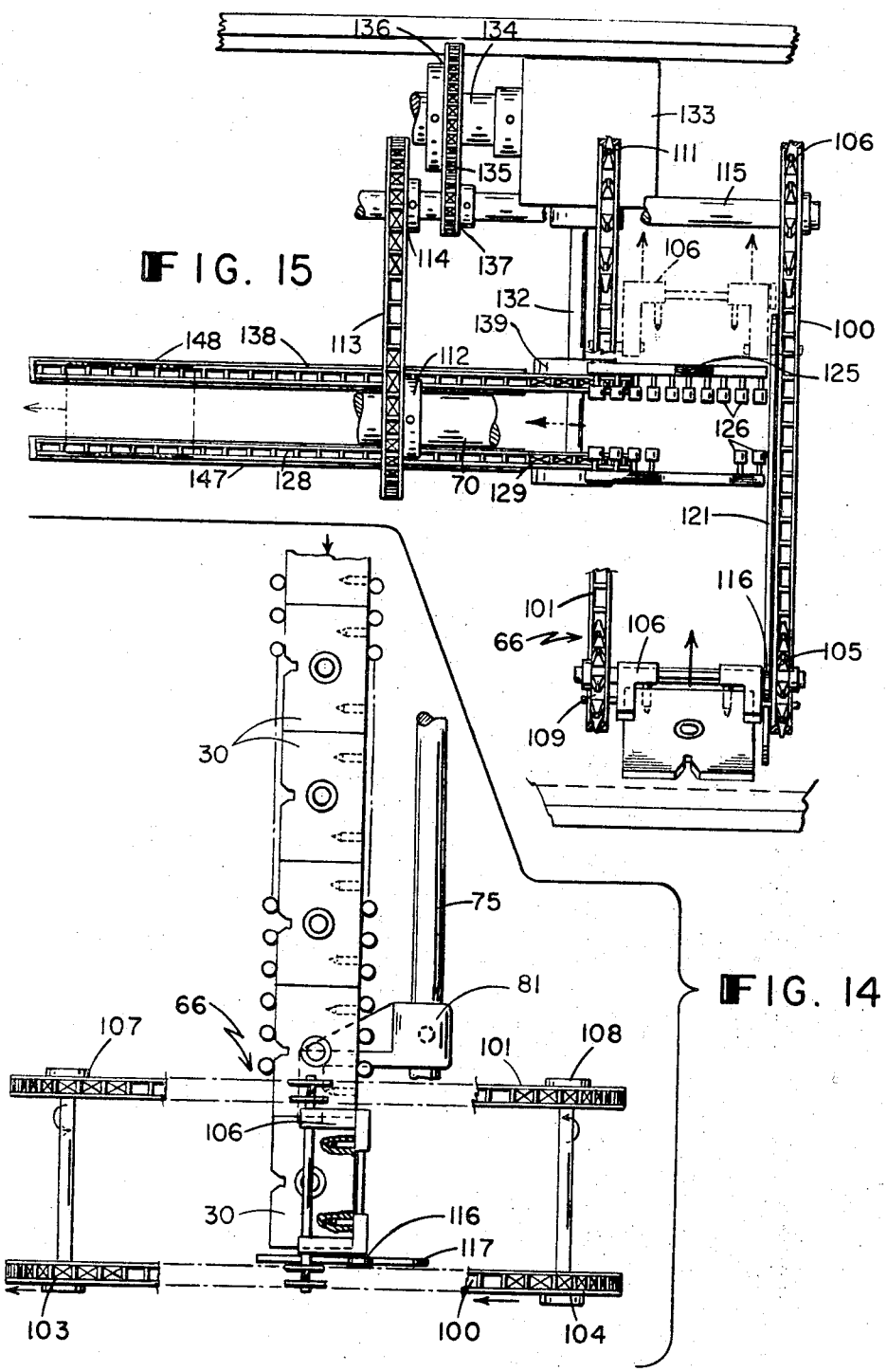

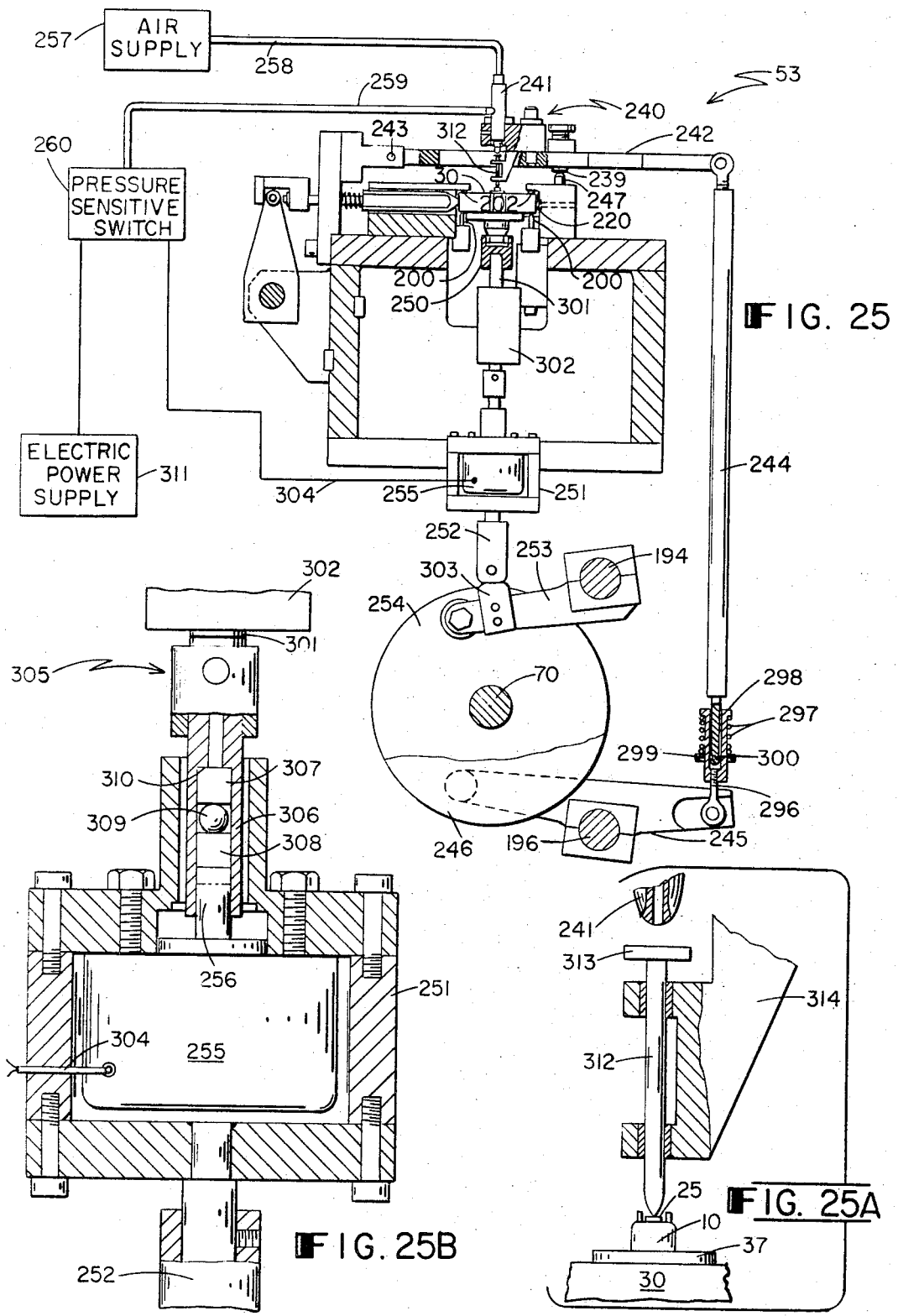

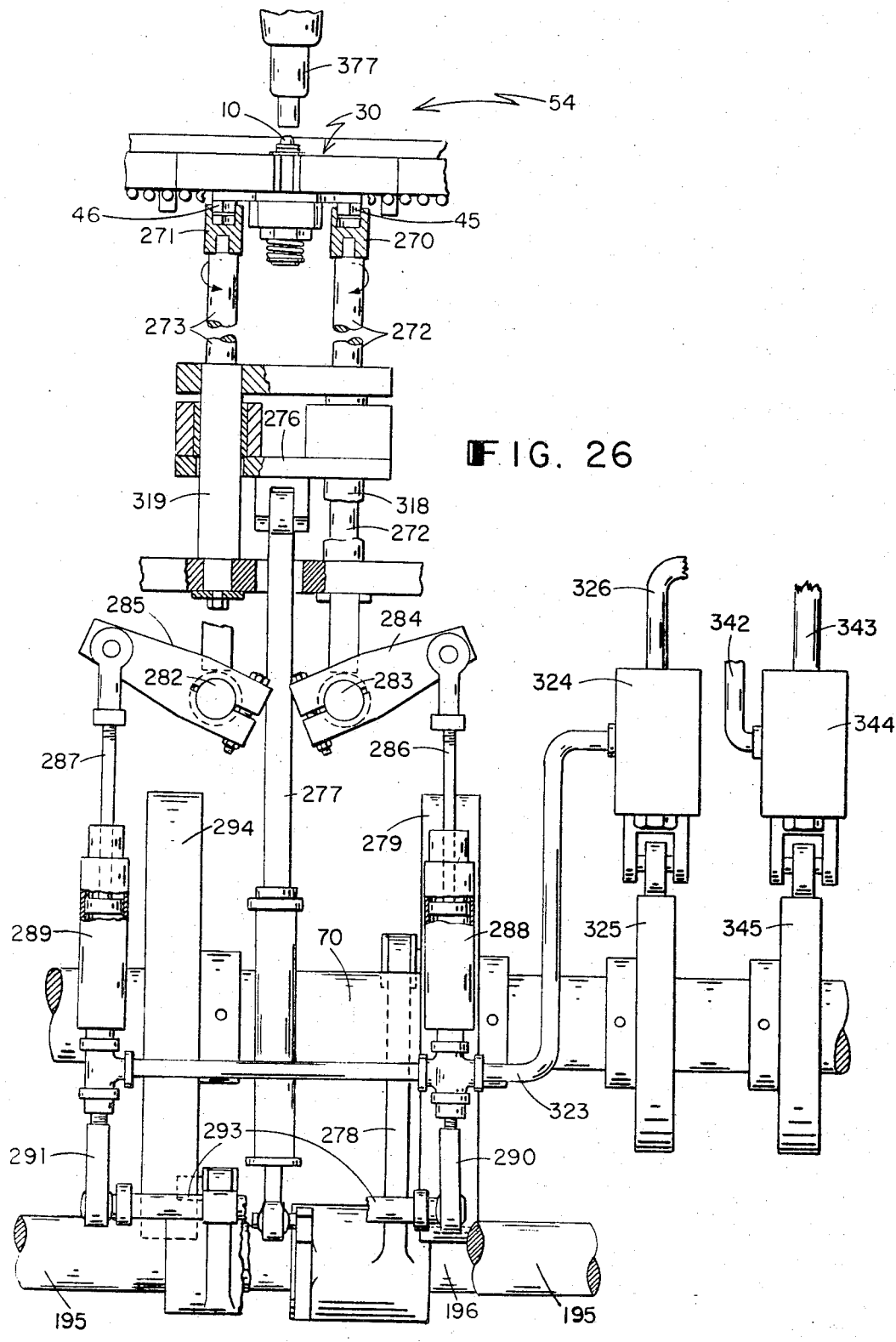

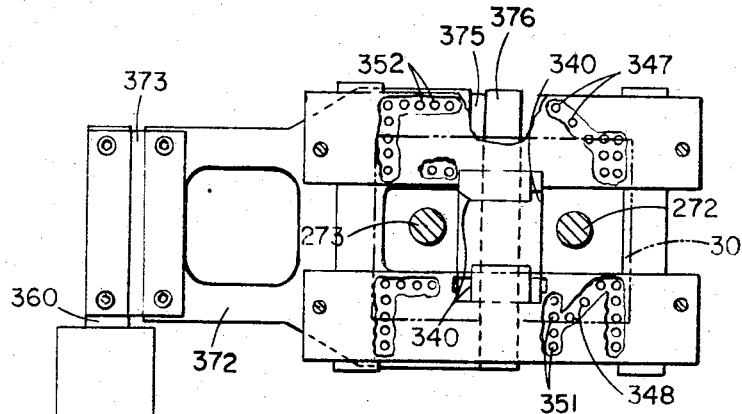
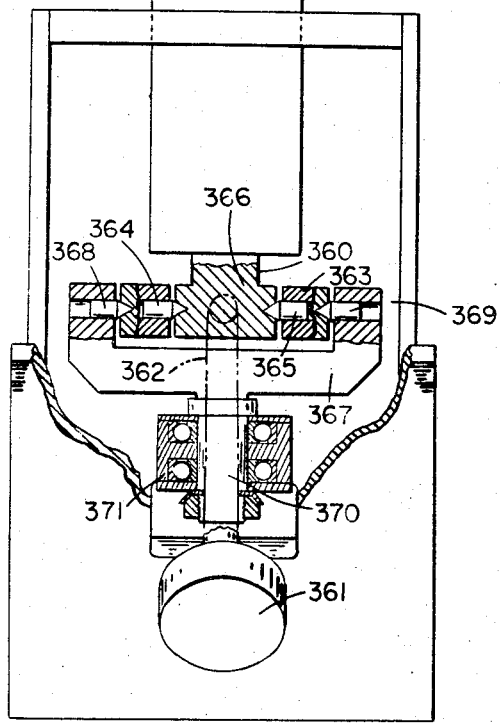
FIG. 28

United States Patent Office 3,379,357
Patented Apr. 23, 1968

3,379,357
CONVEYING AND ORIENTING APPARATUS
Paul L. Chagnon, Hamilton, Mass., Stanley J. Gartner, Emporium, Pa., and Alfred S. Jankowski, Stoneham, Mass., assignors to Sylvania Electric Products Inc., a corporation of Delaware
Filed June 4, 1965, Ser. No. 461,479
14 Claims. (Cl. 228—47)

ABSTRACT OF THE DISCLOSURE

Conveying and orienting apparatus including a plurality of pallets each having a movable holder for supporting an unfinished transistor. Each pallet has vertical and horizontal registration surfaces to permit accurate positioning of the pallet at each of a series of stations through which it is indexed in sequence. The position of the holder in the pallet is adjusted vertically and horizontally at positioning stations so as to position the transistor semiconductor die at a precise location with respect to the registration surfaces of the pallet. Thus, when a pallet is accurately positioned at a wire bonding station by reference to its registration surfaces, the semiconductor die is accurately positioned with respect to the wire bonding mechanisms.

Figure 7:
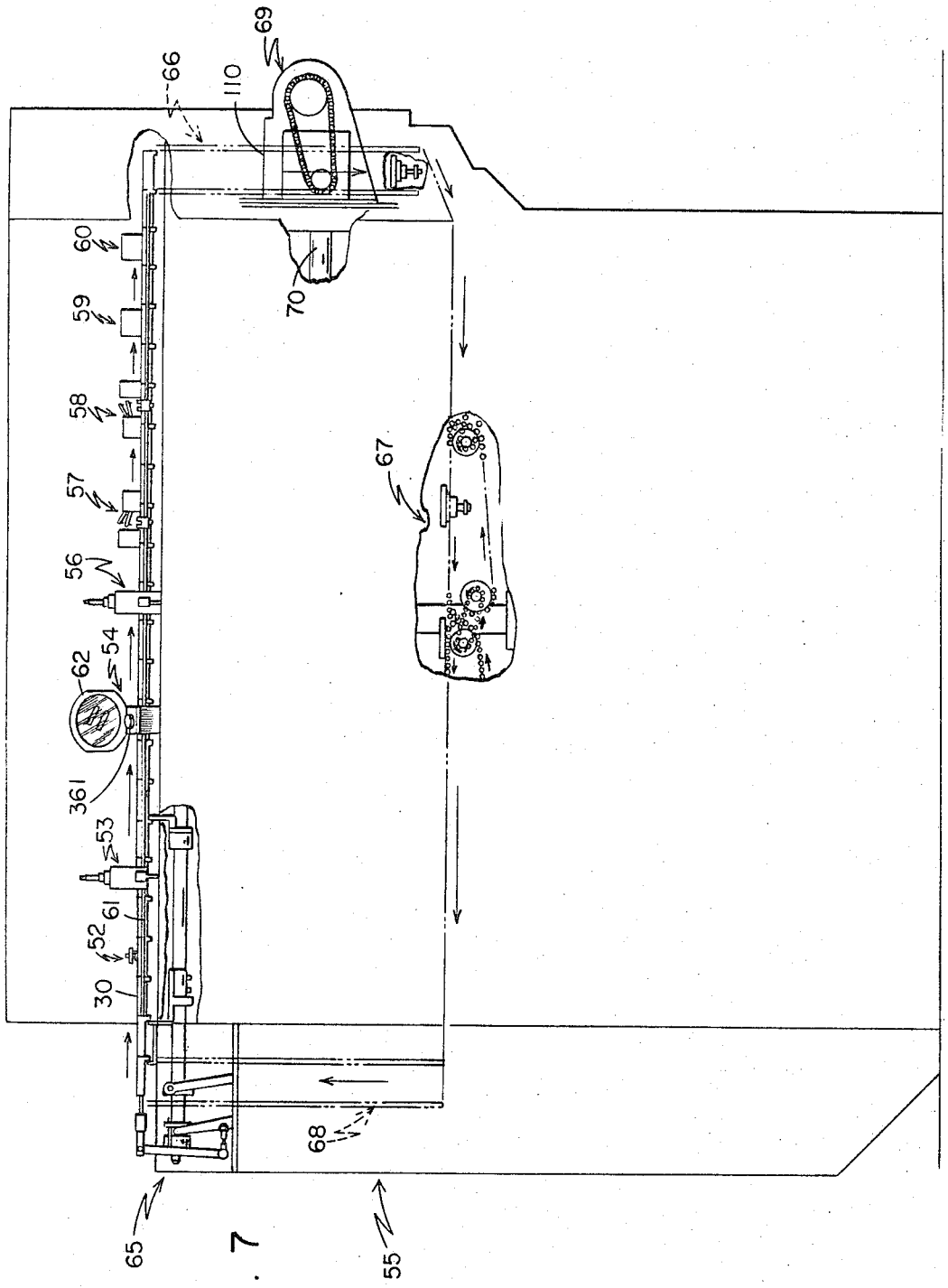

This invention relates to conveying and handling apparatus. More particularly, it is concerned with conveying apparatus for orienting small articles and delivering them to a work area whereby they are located at the work area in precisely predetermined position with respect to the work area.

The handling and processing of small parts is often difficult to accomplish with automatic mechanized equipment. Therefore, many operations in the production of small intricate devices, such as, for example, semiconductor devices, which require a high degree of precision are performed manually with bench-type apparatus. As a particular example, in the assembly of several types of semiconductor devices it is necessary to connect short lengths of fine wire between conductive regions on the surface of a wafer of semiconductive material and the leads of the device enclosure. The fine wires may be less than 1 mil in diameter and the regions to which they are bonded are about 1 mil x 2 mils. The devices must be precisely oriented and located with respect to the wire handling and bonding mechanisms in order that the connections may be made properly.

With the bench-type apparatus commonly employed an operator orients a device and positions it in proper location by the use of micromanipulators, which produce small movements of the device and apparatus for large hand movements, while observing the device through a microscope. Each device is separately handled, oriented, and processed. Automatic and semiautomatic equipment of the type in which articles are indexed in succession through a series of processing stations has not been capable of delivering the devices to processing stations so that the articles are located with respect to the mechanisms at the stations within the degree of precision required.

It is an object of the present invention, therefore, to provide improved apparatus for delivering an article to a processing location in a precisely predetermined position.

It is another object of the invention to provide improved apparatus for conveying and orienting small parts.

It is a more specific object of the invention to provide improved apparatus for high speed, continuous production assembly of semiconductor devices.

Briefly, in accordance with the foregoing objects apparatus according to the invention for placing an article in a processing location in a predetermined position with respect to the location includes a pallet for supporting an article. The base member of the pallet has registration means thereon. A holder which is adapted to receive an article is moveably supported by the base member. The pallet also includes means for maintaining the holder in fixed position with respect to the base member. The apparatus includes a station having means for moving the holder with respect to the base member to position the article in a predetermined position with respect to the registration means on the base member. The apparatus also includes a work station having a processing location or work area. The work station has means which cooperate with the registration means on the base member of the pallet so as to locate the base member with the registration means in a predetermined position with respect to the work area. Thus, an article in a predetermined position with respect to the registration means becomes located in a predetermined position with respect to the work area.

A plurality of pallets are indexed in stepwise fashion along a track having several stations spaced therealong. While a pallet is located at a station, mechanisms at the station perform an orienting or processing operation on the article supported in the pallet. Continuously operating conveyors are provided for removing pallets from the end of the track and transferring them back to the beginning of the track.

Figure 8:
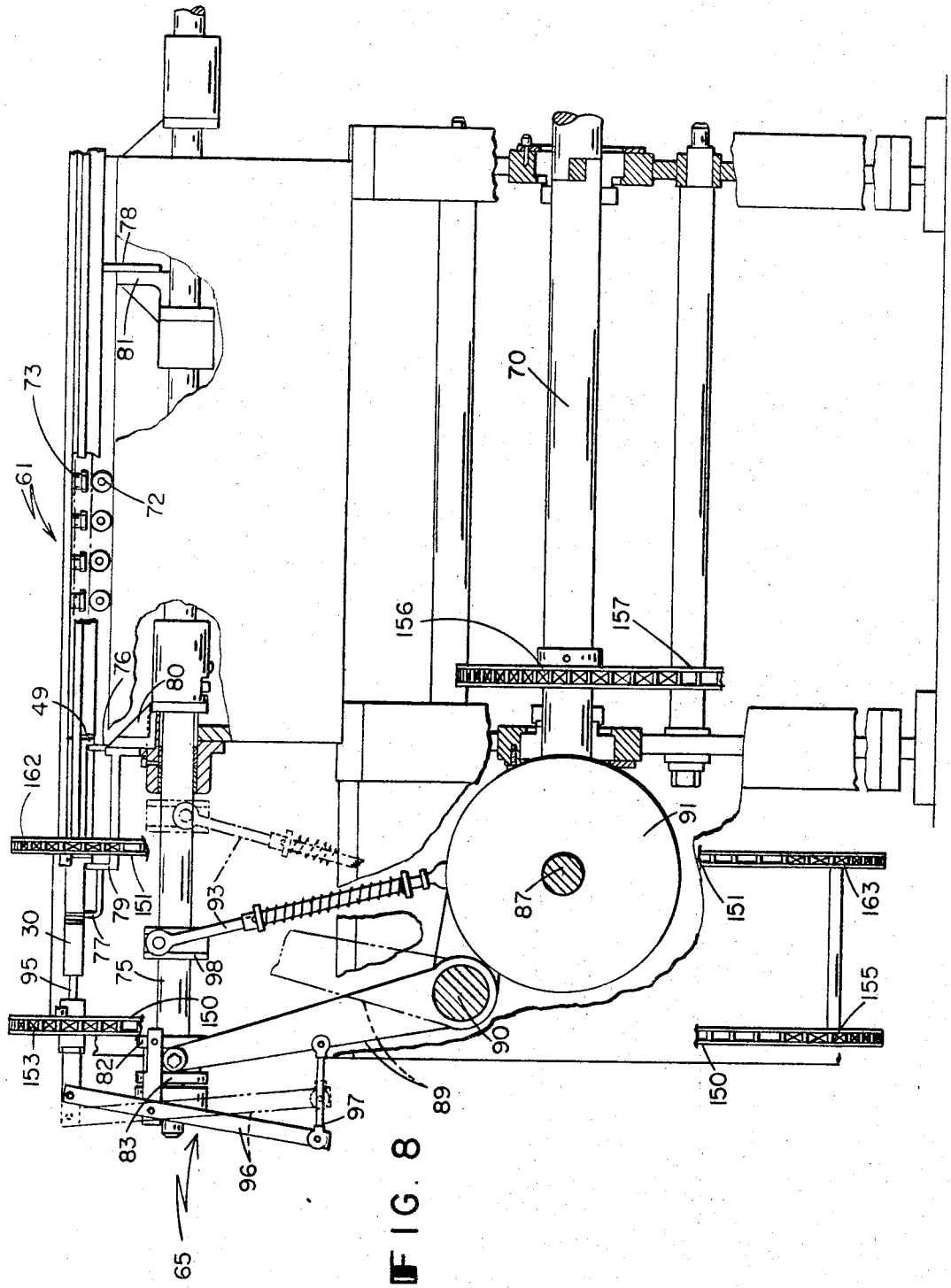
Figure 9:
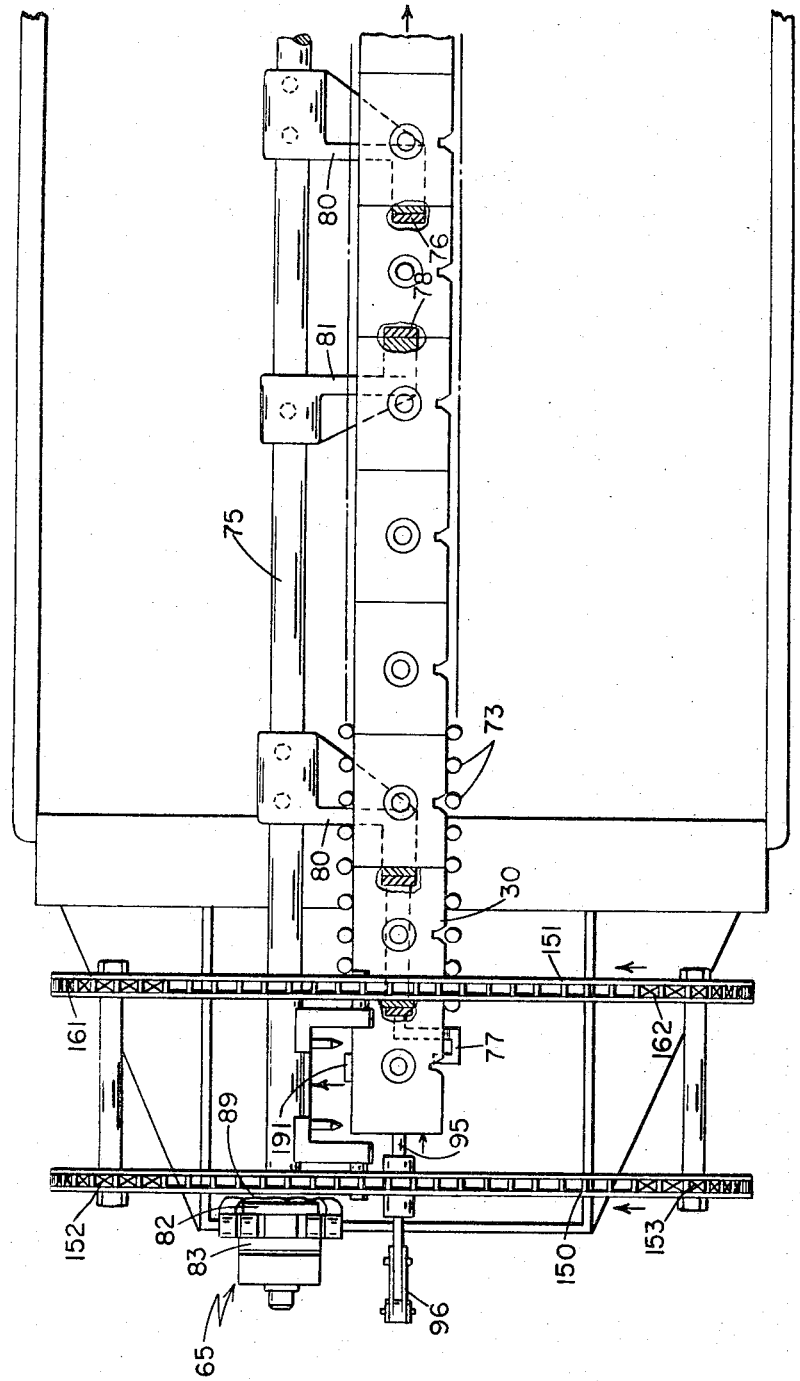
Figure 16:
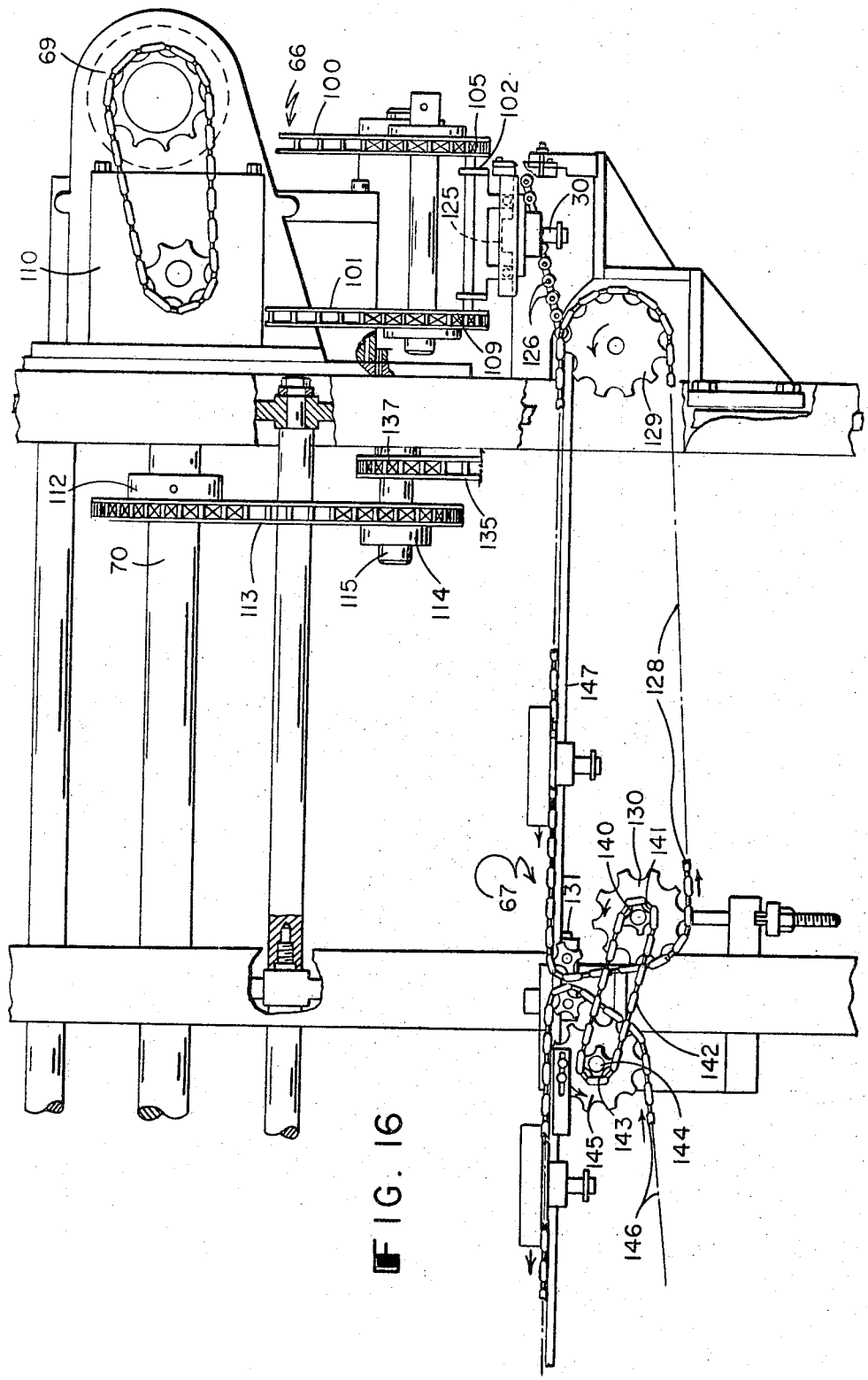
Figure 17:
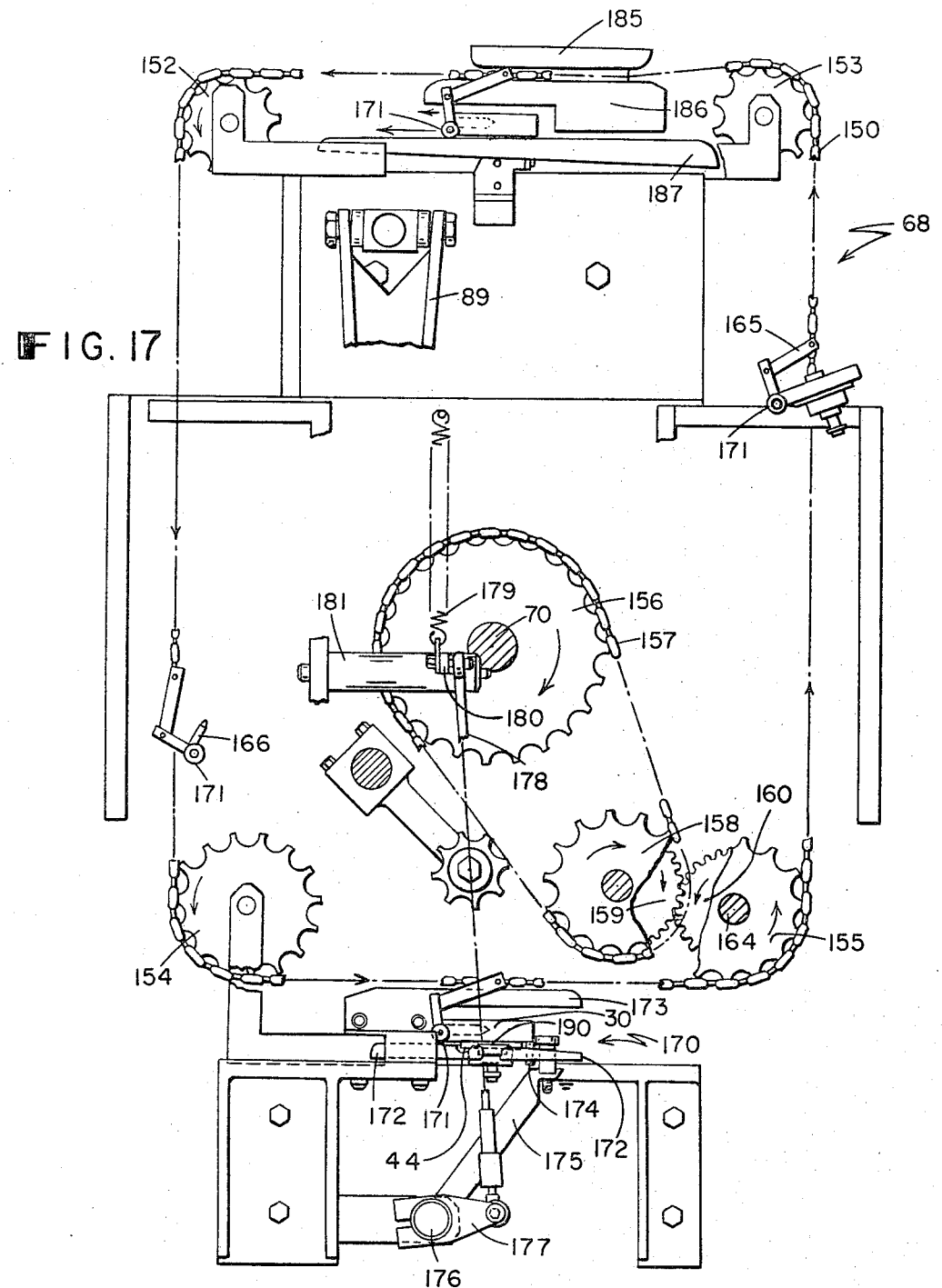
Figure 18:
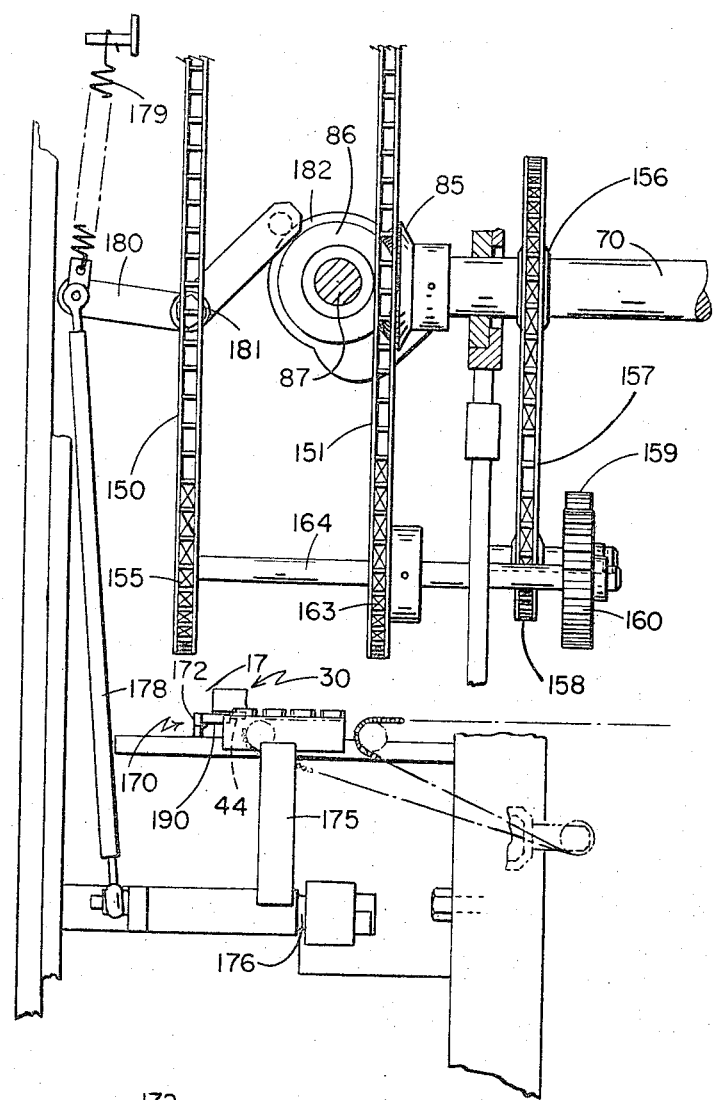
Figure 19:
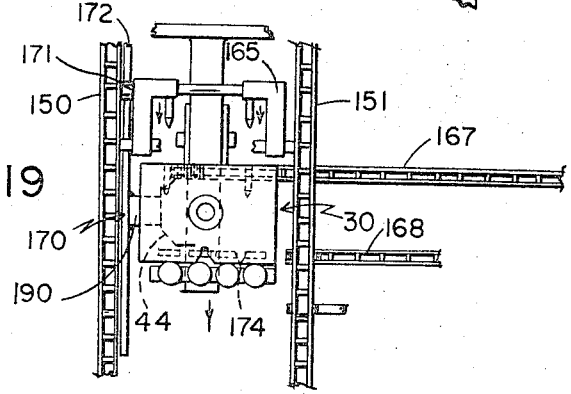
Figure 20:
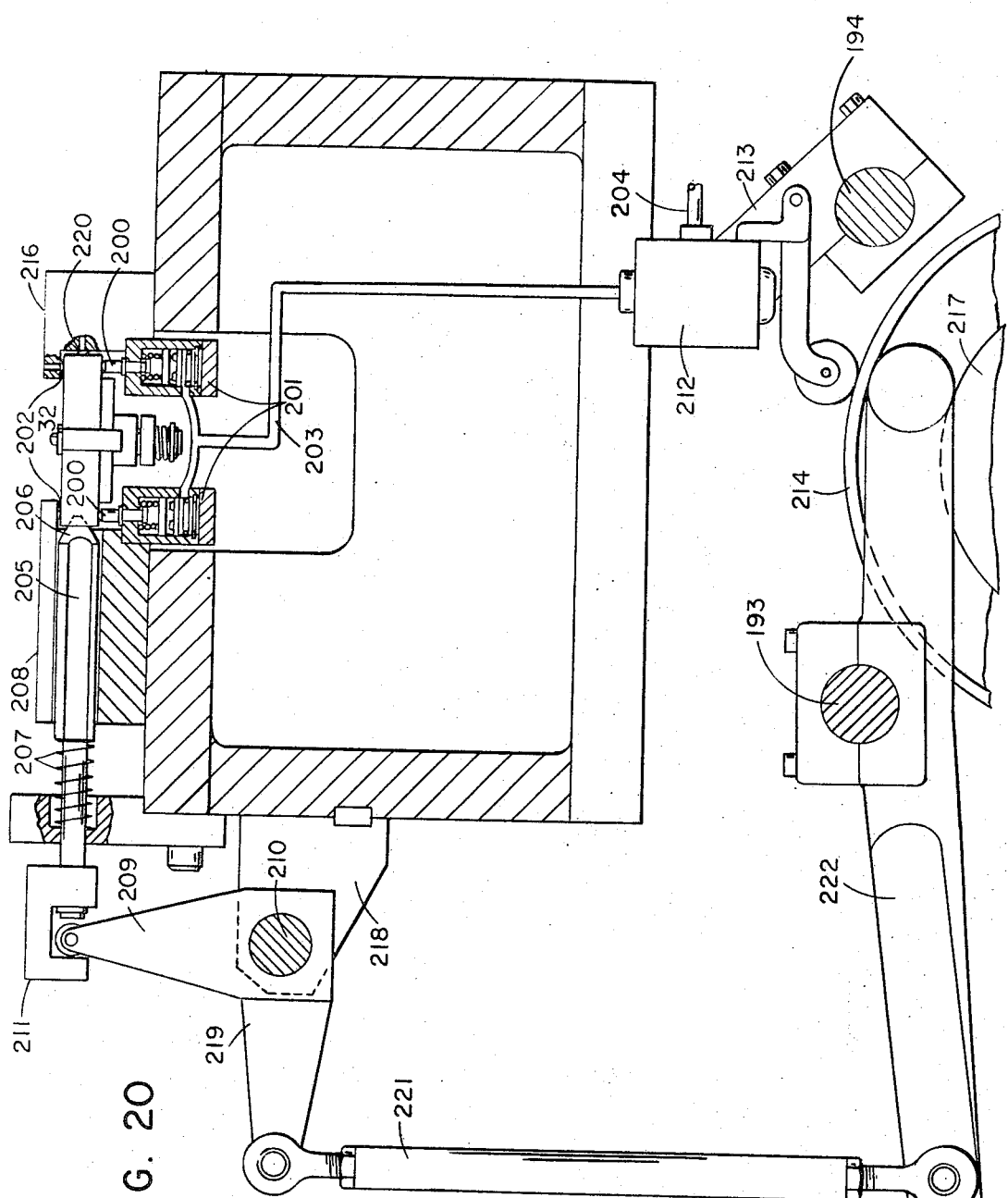
Figure 21:
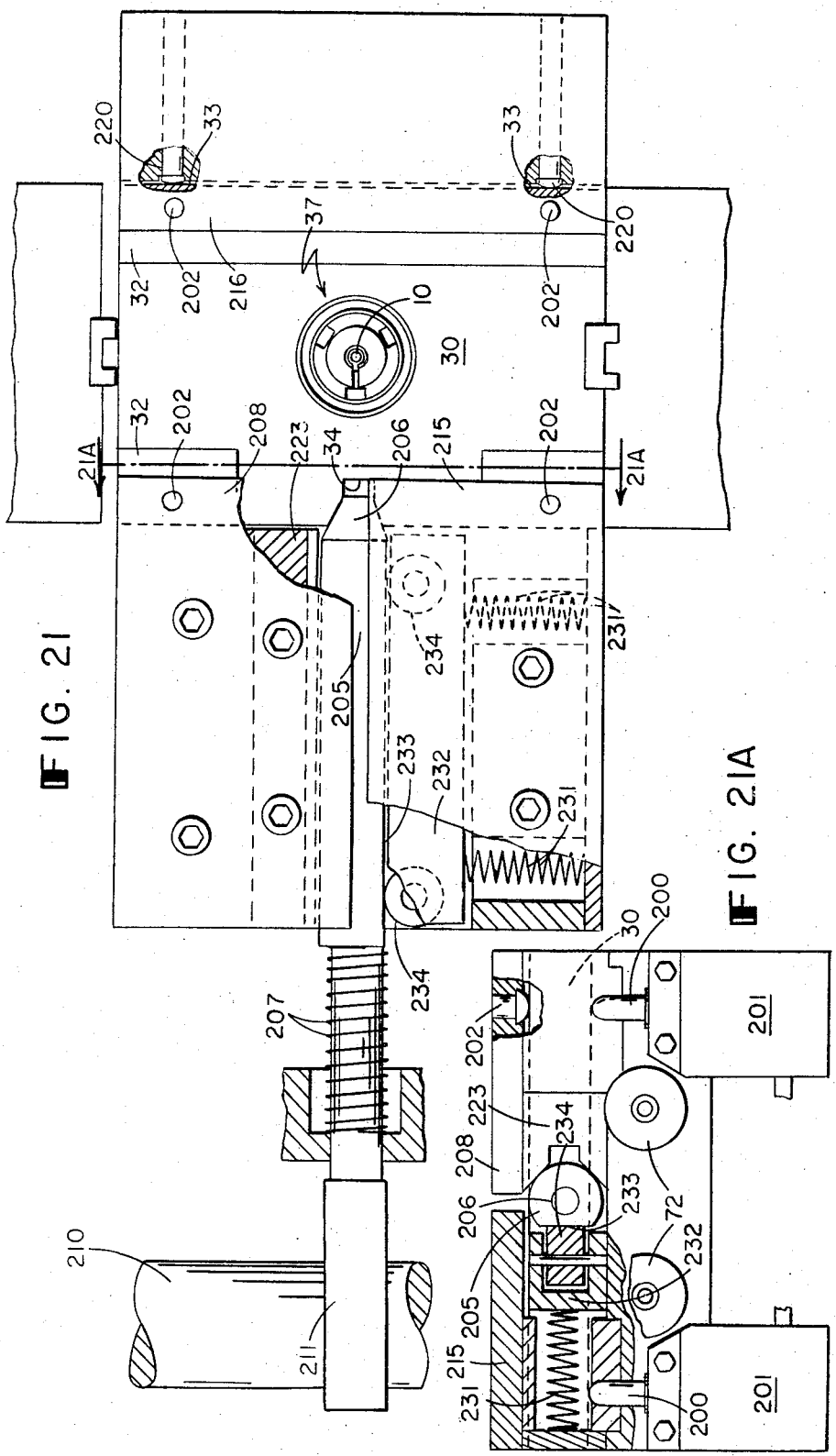
Figure 22:
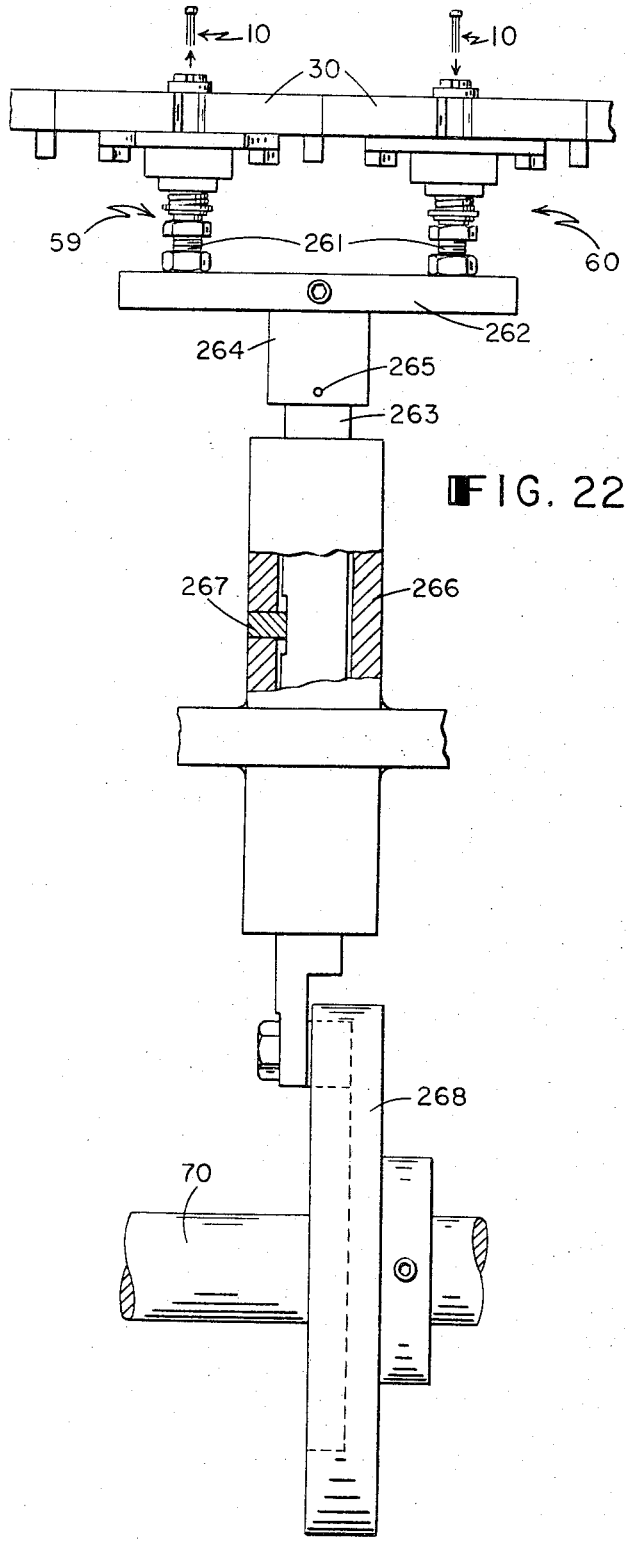
Figure 23:
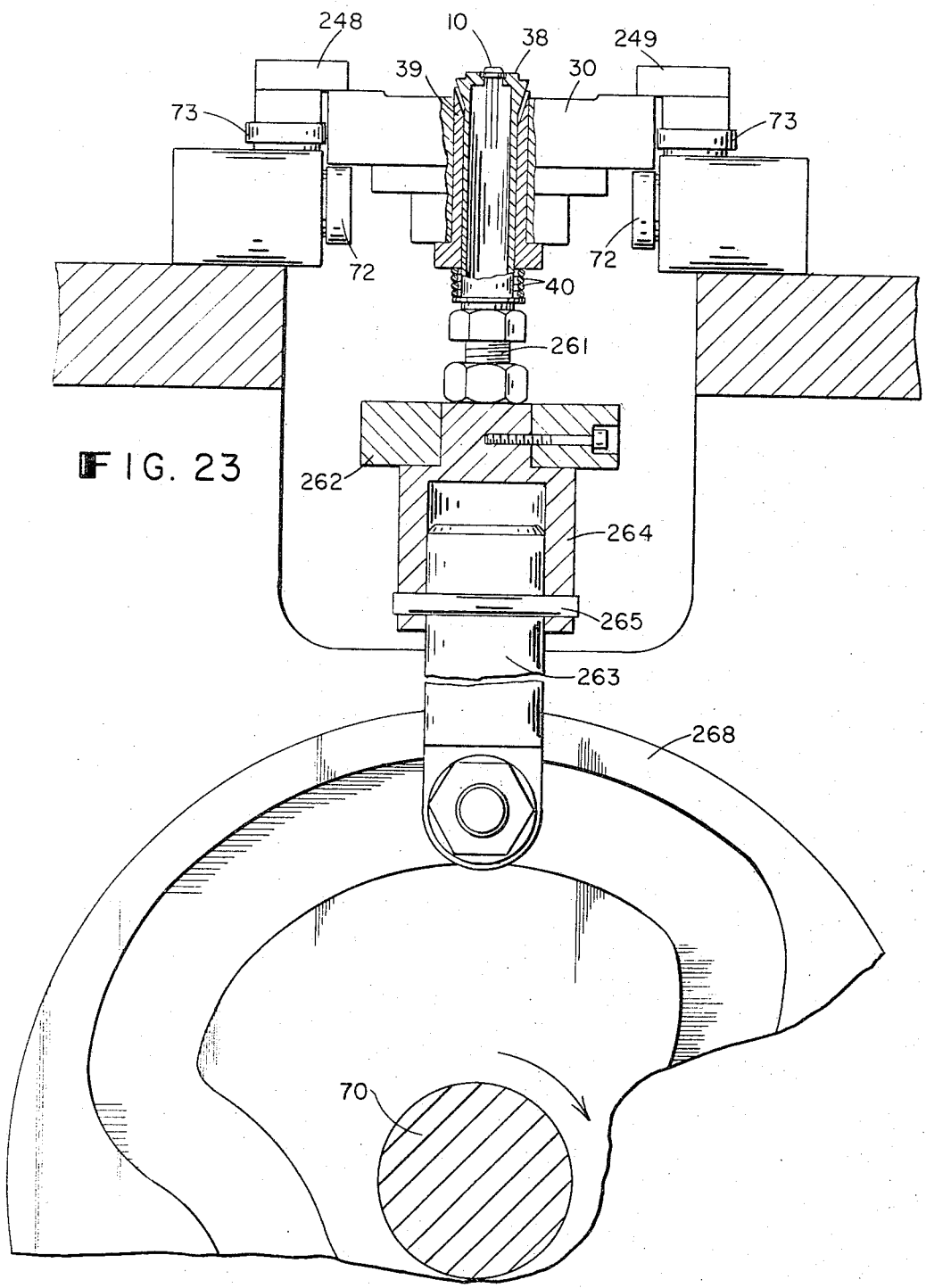
Figure 24:
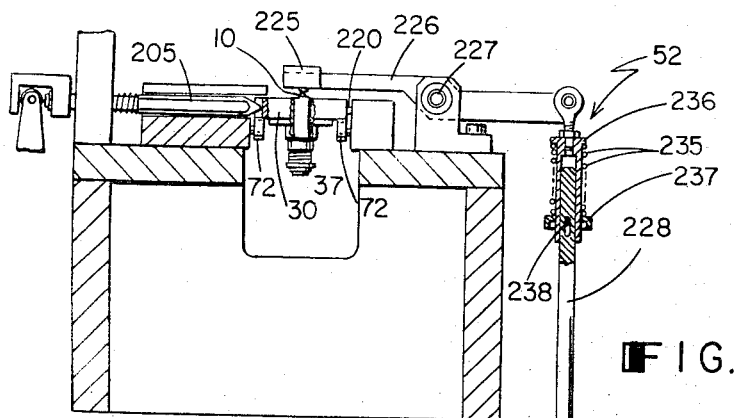
Figure 24A:
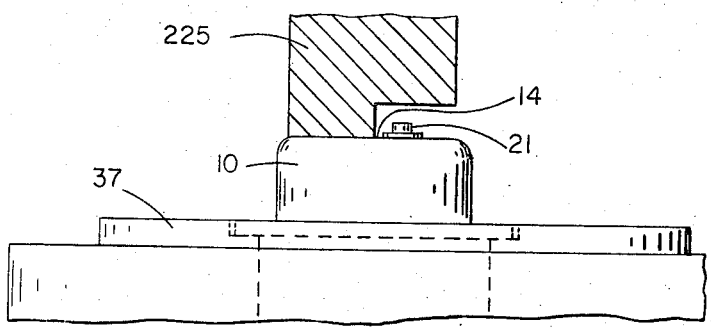
Figure 27:
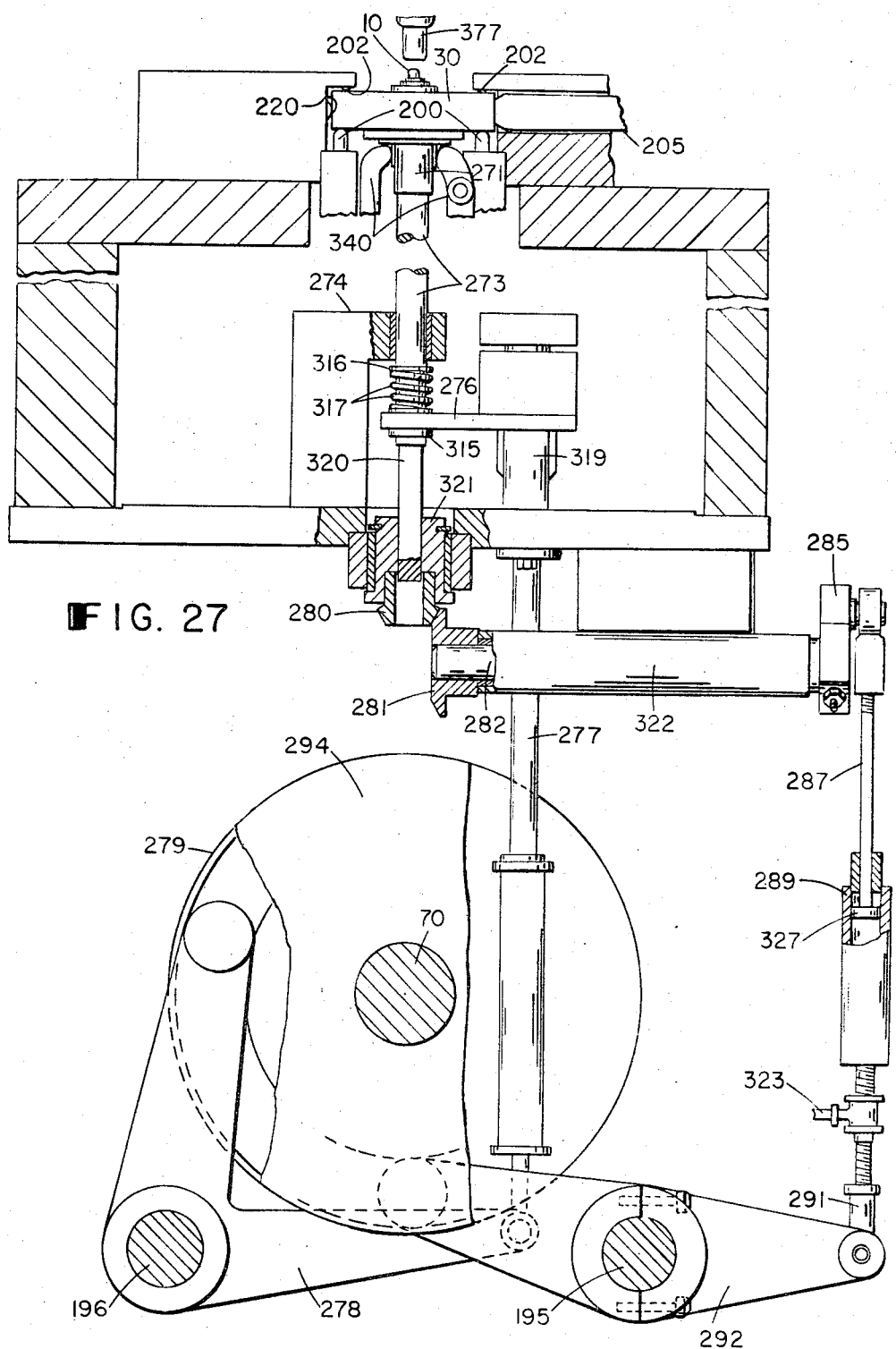
Figure 29:
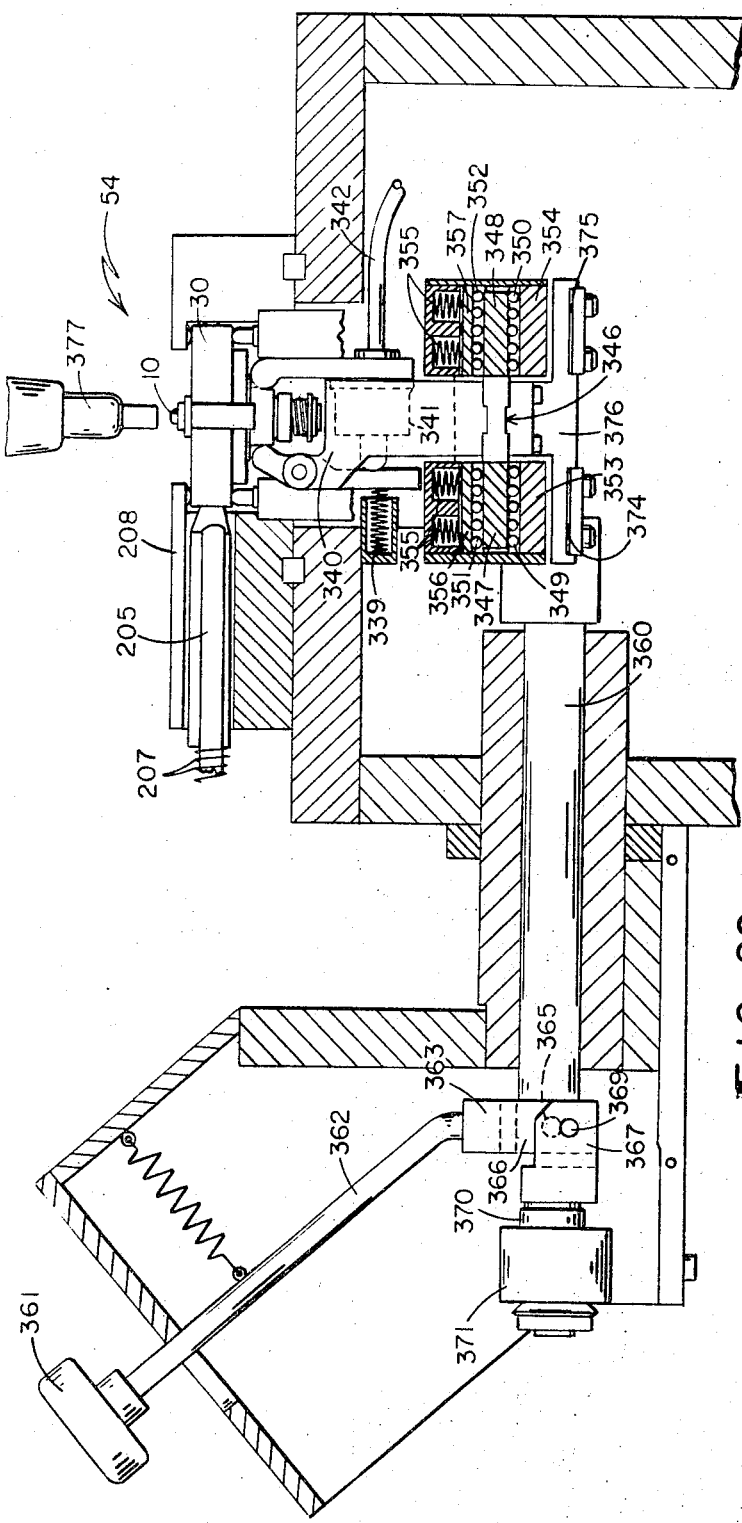
Figure 30:
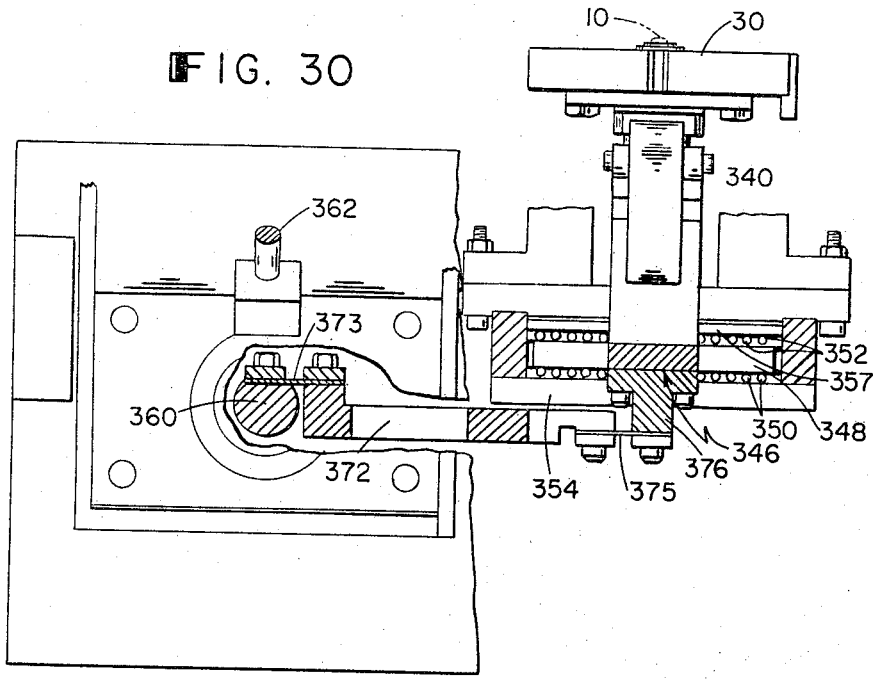
Figure 31:
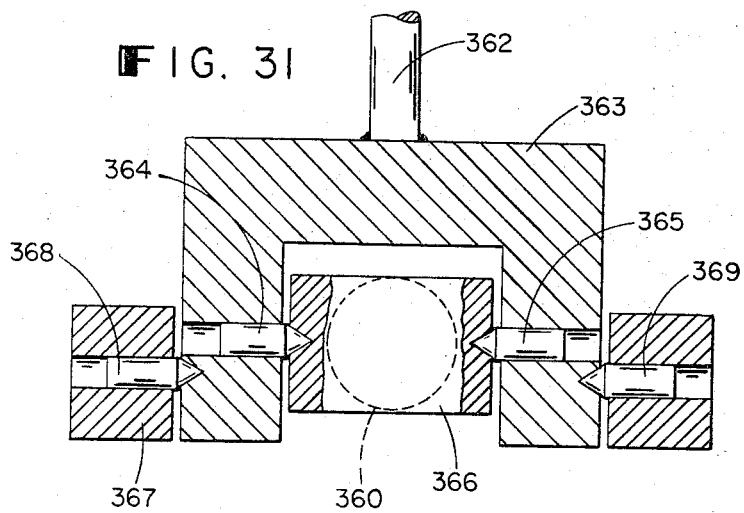
Figure 34:
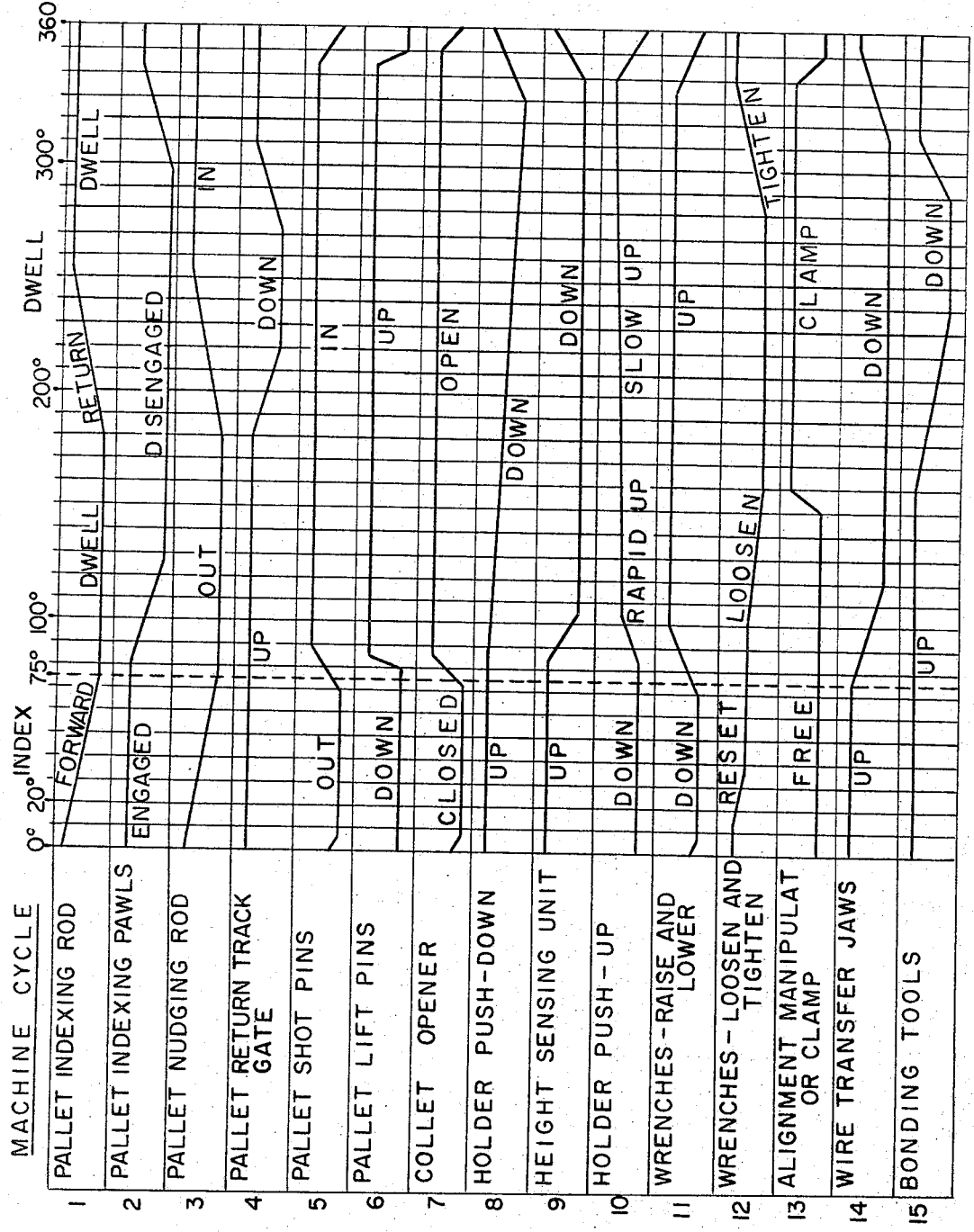

Additional objects, features, and advantages of apparatus according to the invention will be apparent from the following detailed discussion and the accompanying drawings wherein:

FIG. 1 is a perspective view of a transistor to be processed by the apparatus according to the invention, FIG. 2 is a plan view of a pallet adapted to receive the transistor and carry it through the apparatus, FIG. 3 is a side elevational view of the pallet of FIG. 2, FIG. 4 is a view of the underside of the pallet of FIG. 2, FIG. 5 is a side elevational view in cross-section of the pallet of FIG. 2 taken along the line 5—5 of FIG. 2, FIG. 6 is an end elevational view in cross-section of the pallet of FIG. 2 taken along the line 6—6 of FIG. 2, FIG. 7 is an elevational view of the front of the apparatus according to the invention showing various stations spaced along a track on which a plurality of pallets are supported and moved in stepwise fashion, FIG. 8 is a front elevational view of the first section of the apparatus of FIG. 7 with portions broken away to show the arrangement for advancing the pallets along the track, FIG. 9 is a plan view illustrating portions of the arrangement for advancing the pallets along the track, FIG. 10 is a plan view showing details of the driving mechanism of the pallet advancing arrangement, FIG. 11 is a front elevational view showing in detail a portion of the driving mechanism of FIG. 10, FIG. 12 is a right side elevational view showing in detail another portion of the driving mechanism of FIG. 10, FIG. 13 is a right side elevational view of the last section of the apparatus with portions broken away showing the conveyor for removing pallets from the end of the track and the arrangement for driving the conveyor, FIG. 14 is a plan view of a portion of the last section of the apparatus showing the end of the track and the conveyor for removing pallets from the end of the track, FIG. 15 is a plan view of the portion of the last section of the apparatus below the view of FIG. 14 showing the arrangement for providing driving power to mechanisms of the apparatus and also showing portions of the conveyor which removes the pallets from the end of the track and the track which returns the pallets to the first section of the apparatus, FIG. 16 is a front elevational view of the lower portion of the last section of the apparatus with portions broken away showing details of the conveyor for removing pallets from the main track and the track for returning the pallets to the first section and also showing the arrangement for driving the mechanisms of the apparatus, FIG. 17 is a left side elevational view of the first section of the apparatus with portions broken away showing the pallet return conveyor which carries the pallets from the return track to the beginning of the main track and also showing the arrangement for driving the conveyor, FIG. 18 is a front elevational view at the first section of the apparatus showing details of the pallet transfer gate between the return track and the return conveyor, FIG. 19 is a plan view of the pallet transfer gate shown in FIG. 18, FIG. 20 is a right side elevational view at one of the stations along the track illustrating details of the mechanisms for precisely locating a pallet at the station, FIG. 21 is a plan view of the station of FIG. 20, FIG. 21A is an elevational view from the rear of the station of FIGS. 20 and 21 taken generally along the line 21A—21A of FIG. 20 but with portions broken away, FIG. 22 is a front elevational view of the mechanism at transistor loading and unloading stations for opening collets in the pallet holders to permit transistors to be placed in and removed from the pallets, FIG. 23 is a left side elevational view showing details of the collet opening mechanism of FIG. 22, FIG. 24 is a right side elevational view of a mechanism for lowering the vertical height of the holder and transistor with respect to the base member of the pallet, FIG. 24A is an enlarged view from the front showing details of the mechanism of FIG. 24, FIG. 25 is a right side elevational view of a mechanism for precisely setting the vertical level of the transistor with respect to the base member of the pallet, FIG. 25A is an enlarged view showing in detail a portion of the mechanism of FIG. 25 and the transistor, FIG. 25B is an enlarged view showing in detail a portion of the mechanism of FIG. 25, FIG. 26 is a front elevational view of a mechanism for releasing the fastenings securing the holder in a pallet so as to permit horizontal movement of the holder, FIG. 27 is a left side elevational view illustrating the mechanism of FIG. 26, FIG. 28 is a plan view of a manipulating mechanism for moving the holder horizontally to permit the transistor to be positioned in precise horizontal alignment with respect to the base member of the pallet, FIG. 29 is a right side elevational view of the horizontal manipulating mechanism of FIG. 28, FIG. 30 is a front elevational view of the horizontal manipulating mechanism of FIGS. 28 and 29, FIG. 31 is a front elevational view in cross-section of a portion of the mechanism of FIG. 28, FIG. 32 is a plan view of a wire bonding station, FIG. 33 is a right side elevational view showing the wire bonding station of FIG. 32, FIG. 33A is an enlarged view illustrating the bonding of a length of wire to a transistor, and FIG. 34 is a timing chart indicating the operating sequence of the various mechanisms of the equipment.

GENERAL DESCRIPTION

The transistor

FIG. 1 illustrates a semiconductor transistor 10 which is typical of the small semiconductor devices which may be handled by apparatus according to the invention. The electrically active elements 11 of the transistor are mounted on the base section or header 12 of a commonly employed type of two-part semiconductor device enclosure. The base section includes a cylindrical metal casing 13 having a flat upper surface 14 and an outwardly turned lower rim 15 for sailing to a cover portion (not shown) to complete the enclosure. An orienting tab 16 extends outwardly from the rim. A layer of glass is hermetically sealed in the casing. Two leads 20 and 21 pass through the layer of glass to which they are hermetically sealed and extend through openings in the upper surface of the metal casing. A third lead 22 passes through the layer of glass and makes contact with the casing. The location of the leads is established with respect to the orienting tab 16.

The active elements 11 of the transistor include a wafer or die 25 of semiconductor material having two area electrodes or stripes 27 and 28. The wafer is mounted on the surface 14 of the casing with its bottom surface in ohmic electrical contact with the casing. Illustratively, the wafer may be of germanium with the first stripe 27 providing the contact to the base region of the device and the second stripe 28 providing contact to the emitter region of the device. Contact to the collector region of the device is provided through the wafer of the device, and the third lead 22 is the collector lead of the transistor. Contact wires must be provided between the base stripe 27 and the first lead 20, and between the emitter stripe 28 and the second lead 21 to furnish conductive paths from the base and emitter regions of the active elements to the leads which extend externally of the enclosure when the cover is sealed in position. These base and emitter contact wires 18 and 19, respectively, which are shown in phantom in FIG. 1, are attached by the apparatus according to the invention.

The pallet

During processing in the apparatus according to the invention the transistor 10 is mounted in a pallet or carrier 30 illustrated in FIGS. 2 through 6. The pallet includes a base member 31 having precisely machined flat upper horizontal surfaces 32 which serve as registration surface areas for precisely setting the vertical level of the pallet when located at stations of the apparatus as will be explained below. The base member also has a vertical registration surface area 33 along one side and a slot 34 defined by converging vertical registration surface areas 35 and 36 on the opposite side. These vertical surfaces provide registration surface areas for setting the horizontal alignment of the pallet when located at the stations of the apparatus.

Mounted centrally of the pallet is a holder 37 adapted to receive a transistor 10. The holder includes a collet 38 which can be moved vertically upward within a sleeve 39 against the downward acting force of a compression spring 40. A pin 51 permits vertical movement of the collet with respect to the sleeve while preventing horizontal movement. When the collet is forced upward with respect to the sleeve, the collet opens to accommodate the base section of the transistor. The orienting tab 16 of the transistor fits in a groove 41 in the collet thereby fixing the orientation of the transistor with respect to the holder. Under normal conditions the biasing spring 40 forces the collet downward in the sleeve thus clamping the segments of the collet against the transistor and gripping it firmly.

The holder 37 is supported in a mounting 42 which includes a cylindrical member 23 and a plate 24. A pressure pad 29 is forced against the flattened surface of the collet sleeve 39 by a compression spring 43 which passes through an opening in the member 23 and bears against the plate 24. The holder is held against vertical movement with respect to the remainder of the pallet by the pressure of the spring acting through the presusre pad. The holder is movable vertically through a limited distance by overcoming the frictional force exerted by the pressure pad 29 on the holder sleeve 39. A pin 26 which is fixed to the base member and extends into a cavity in the plate 24 prevents the mounting from rotating.

The holder mounting 42 is held in place by a retaining plate 44. The retaining plate is fastened to the base member 31 by bolts 45 and 46 and nuts 47 and 48. When the bolts and nuts are tightened, the retaining plate 44 clamps the holder mounting 42 against the base member 31 locking the holder mounting 42 and holder 37 in fixed horizontal alignment with respect to the base member.

Thus, a transistor in the holder 37 may be moved vertically with respect to the horizontal registration surface areas 32 by overcoming the frictional force exerted by the compression spring 43. The transistor together with the holder and holder mounting may be moved horizontally with respect to the vertical registration surface areas 33, 35, and 36 when the bolts 45 and 46 are loosened, and is tightly held in horizontal alignment with respect to the vertical registration surface areas when the bolts are tightened.

A pawl 49 is fixed to the forward end of the base member. The pawl is engaged by the mechanism of the apparatus which feeds the pallets in stepwise fashion along the track of the apparatus.

Two openings 50 extend into the base member from one side. These openings are adapted to receive the supporting pins of pallet carriers on the conveyors of the apparatus.

*The apparatus*

A general view of the apparatus 55 in which transistors 10 mounted in pallets 30 are processed can best be seen from the overall front elevational view of FIG. 7. The pallets 30 are arranged in tandem along a main track 61. They are moved along the track in a stepwise fashion and pass through a series of stations spaced along the track. The first station along the track from the forward end of the apparatus, the left in FIG. 7, is a holder push-down station 52 at which the holder of a pallet is forced downward to the lowest level permitted by the configuration of the pallet. The next station is a holder push-up or vertical height setting station 53 which precisely sets the level of the upper surface of the transistor semiconductor die with respect to the horizontal upper registration surface areas of the pallet. At a horizontal alignment station 54 an operator views the upper surface of the transistor through a magnifying viewer 62. At this station the bolts 46 and 46 holding the retaining plate 44 are automatically loosened, and by manipulating the control handle 361 the operator moves the transistor holder to position the stripes of the transistor in proper position with respect to a reticle in the optical system of the viewer. The stripes are thereby positioned in precise horizontal alignment with respect to the vertical registration surface areas 33, 35, and 36 on the base member. The pallet then passes through a second holder push-up station 56. Since the vertical level of the transistor may have been disturbed slightly while the pallet was at the horizontal alignment station, the level of the transistor is raised slightly to set the semiconductor die at a new precisely predetermined level with respect to the horizontal registration surface areas of the pallet.

The pallet and the transistor which is precisely oriented with respect to the registration surface areas of the pallet proceeds to a first bonding station 57 at which a contact wire is bonded to one of the stripes and to the appropriate lead. Then the pallet is advanced to a second bonding station 58 at which the other contact wire is bonded to the other stripe and to the appropriate lead. Next the pallet is moved to an unloading station 59 at which the collet is opened permitting the processed transistor to be removed from the holder. The last station along the track is a loading station 60 at which the collet is opened permitting a transistor without contact wires to be placed in the holder.

The pallets are advanced periodically along the main track 61 at a distance equal to the length of a pallet during the index period of each operating cycle of the equipment, and the pallets remain stationary during the dwell period of each operating cycle in accordance with the timing chart of FIG. 34. The pallets are advanced by a feeding arrangement 65 which pushes the pallets along the track.

During each dwell period the pallet in the final position at the end of the track is removed from the track by a continuously operating conveyor 66. This conveyor 66 carries the pallet from the end of the track to a continuously operating return track 67 located directly beneath the main track. The pallets are carried by the return track to the first section of the equipment. Pallets are removed from a transfer gate at the end of the return track by a continuously operating conveyor 68. This conveyor removes the pallets from the return track and carries them to the main track loading gate at the beginning of the main track.

The equipment is operated by an electric motor 69 mounted on the last section of the equipment. The motor is connected to a main cam shaft 70 through reduction gears 110. During each operating cycle of an index period and a dwell period the cam shaft makes one complete revolution. The pallet indexing arrangement, the continuously operating conveyors, and the various mechanisms at the stations along the track are all driven from the main cam shaft.

In summary, the equipment operates as follows to connect contact wires between the stripes and the appropriate leads of a transistor 10. When a pallet is at the loading station 60 during a dwell period the collet of the pallet is automatically opened and an operator inserts a transistor 10 into the collet 38 of the holder 37 with the orienting tab 16 in the groove 41 of the collet. The collet is subsequently moved into the last position on the track. During the following dwell period the pallet is engaged by a pallet carrier of the pallet removing conveyor 66 and removed from the track.

The pallet removing conveyor carries the pallet to the return track 67 which runs beneath the main track 61. The pallet is disengaged from the carrier of the conveyor 66 and is placed on the return track 67. The return track carries the pallet the length of the equipment to a transfer gate at the end of the track in the first section of the apparatus. A pallet carrier on the continuously operating pallet return conveyor 68 picks up the pallet and carries it to the main track loading gate at the beginning of the main track 61. The arrival of the pallet at the gate is timed to occur during a dwell period when the gate is not occupied by a pallet.

The pallet is advanced along the track by the pallet advancing arrangement 65. During the index period of each operating cycle each pallet is moved a distance equal to the length of a pallet. During the dwell period of each cycle the pallets remain stationary on the track.

Each pallet is fed along the main track and in turn occupies each of the stations spaced along the track during a dwell period. At the holder push-down station 52 the holder and transistor are lowered sufficiently to insure that the transistor is at a level below that at which it is desired to position the transistor at subsequent stations. At the first height setting station 53 the holder is raised to set the upper surface of the transistor semiconductor die at a predetermined level with respect to the horizontal registration surface areas of the pallet base member. The next station is the horizontal alignment station 54 at which an operator manipulates the transistor holder to place the stripes of the transistor in precise horizontal alignment with respect to the vertical registration surface areas of the pallet base member. The pallet then moves to the second height setting station 56 at which the vertical level of the stripes is reset at a precise predetermined level with respect to the horizontal registration surface areas of the pallet base member.

The pallet, supporting the transistor in proper position with respect to the registration surface areas, is moved into the first bonding station 57. The pallet is held with the registration surface areas in precise position with respect to the mechanisms at the station. While the pallet is at the station a length of contact wire is bonded to one of the stripes and to the appropriate lead. The pallet then proceeds to the second bonding station 58, similar to the first, at which a second length of contact wire is bonded to the other stripe and the other lead. Next, the pallet passes to the unloading station 59 where the collet is opened and an operator removed the transistor from the holder.

PALLET CONVEYING SYSTEM

Pallet indexing arrangement

The pallet indexing arrangement 65 which advances the pallets along the main track 61 is shown in detail in FIGS. 8 and 9. FIG. 8 is a front elevational view of the first section of the equipment with portions broken away to reveal details of the indexing arrangement. FIG. 9 is a plan view of the first section of the equipment with portions removed to show the indexing arrangement. The main track 61 which supports and permits movement of the pallets includes two rows of rollers 72 on which the pallets ride. The pallets are guided by a row of rollers 73 along each side of the pallets.

The pallets are moved along the track by the reciprocating action of an indexing rod 75 which is journaled in the frame of the apparatus. Indexing pawls 76 attached to the indexing rod by brackets 80 each contact the rearward face of the pawl 49 of a pallet 30. The indexing pawls 76 are spaced along the rod 75 so that every fifth pallet is engaged by a pawl. Also attached to an indexing rod 75 by brackets 81 are retaining pawls 78. A retaining pawl 78 is positioned to contact the forward face of the pawl 49 of the foremost pallet of each group of five. As can be seen in FIG. 8, an outrigger pawl 79 attached to the first indexing pawl bracket 80 engages the pawl of the pallet in position at the track loading transfer gate at the beginning of the main track. Fixed to the outrigger pawl 79 is an arm 77 which supports the pallet as it is moved from the gate onto supporting rollers of the track.

During each index period the indexing rod 75 moves to the right as seen in FIGS. 8 and 9 for a distance equal to the length of one pallet. The pawl 76 and the outrigger pawl 79 contact the pallet and push them to the right, the retaining pawl 78 preventing any tendency of the pallets to roll farther along the track. During the dwell period the indexing rod 75 rotates disengaging the pawls 76, 78, and 79 from the pallets. The rod then retracts to its starting position and rotates to move the pawls back into engaging position. The sequence of these events can be seen from the timing chart of FIG. 34.

The indexing rod 75 is advanced and retracted along its path of movement and is rotated to move the pawls 76, 78, and 79 into and out of engagement by a driving mechanism some of which is shown in FIGS. 8 and 9 but which is best seen in FIGS. 10, 11, and 12. FIG. 10 is a view of the driving mechanism from above, FIG. 11 is a front elevational view of the portion of the mechanism which moves the indexing rod 75 reciprocally, and FIG. 12 is a right side elevational view of the portion of the mechanism which rotates the indexing rod 75. The driving mechanism operates from a cam shaft 87 which is driven from the main cam shaft 70 by bevel gears 85 and 86.

The indexing rod 75 is reciprocated forward and backward along the direction of the main track by the action of a rocker arm 89 which pivots about a rocker arm shaft 90 as shown in the front elevational view of FIG. 11. A cam follower at the end of the rocker arm rides in a constrained cam 88 fixed to the cam shaft 87. The upper end of the rocker arm 89 is a yoke which bears against collars 82 and 83 fixed to the indexing rod 75 so as to transmit linear movement to the rod without interfering with rotation of the rod. The rocker arm 89 moves between the fully retracted position shown in full in FIG. 8 and the fully advanced position partially shown in phantom.

Details of the portion of the mechanism which rotates the indexing rod 75 is shown in FIG. 12 which is an elevational view from the right side of the equipment. A rocker arm 92 pivoted on the rocker arm shaft 90 has a cam follower at one end engaging a constrained cam 91 which is fixed to the cam shaft 87. A rod 93 is pivotally connected to the other end of the rocker arm 92. An arm 98 is fixed to the indexing rod 75 and pivotally connected to the upper end of the rod 93. Rotation of the cam shaft 87 and the cams 88 and 91 is translated into appropriate motion of the indexing rod 75 by the mechanisms described in accordance with the timing chart of FIG. 34. In FIG. 8 portions of the reciprocating rocker arm 89 and the rotating arm rod 93 are shown in phantom with the indexing rod 75 at rest in its advanced position and rotated so as to disengage the indexing pawls.

Operating in conjunction with the indexing rod mechanism to feed the pallets along the track is a pallet nudging rod 95. The nudging rod is operated by a lever arm 96 pivotally mounted to the frame of the equipment and connected by a rod 97 to a pivot on the rocker arm 89. As can be seen from the timing chart of FIG. 34, the nudging rod operates during the final portion of the dwell period. A slight nudge is given to the pallet deposited in the track loading gate during the dwell period in order to place it in contact with the preceding pallet.

Pallet removing conveyor

The pallet in the last position at the end of the track is removed from the track during a dwell period by the pallet removing conveyor 66 shown in FIGS. 13, 14, 15, and 16. FIG. 13 is a right side elevational view of the last section of the equipment showing the conveyor, the location at which the conveyor picks up the pallets from the main track, the location at which the conveyor releases the pallets, and the arrangement for driving the conveyor from the main cam shaft. FIG. 14 is a plan view of the conveyor and the end of the main track where the pallets are picked up by the conveyor. FIG. 15 is a plan view below the level of the plan view of FIG. 14 showing the conveyor, the beginning of the return track, and the location at which pallets are released from the conveyor and transferred to the return track. FIG. 16 is a front elevational view of the lower portion of the last section of the equipment showing the conveyor, the beginning of the return track, the arrangement for transferring pallets to the return track, and portions of the equipment driving apparatus.

The conveyor includes two chains 100 and 101 having several pallet carriers 102 suspended between them. The first chain 100 is supported on upper sprockets 103 and 104 and lower sprockets 105 and 106. The second chain 101 is supported on upper sprockets 107 and 108 and lower sprockets 109 and 111. The driving sprockets 106 and 111 are fixed to a shaft 115 which is driven continually by the main cam shaft 70 by means of a sprocket 112, chain 113, and sprocket 114.

The pallet carriers 102 are pivotally suspended between the two chains 100 and 101. A carrier has two pins 118 adapted to mate with the openings 50 in the pallets. A roller 116 is mounted on the lower end of the carrier. As a pallet carrier moves into the transfer gate at the end of the main track the roller 116 on the carrier rides upon a stationary cam 117. The height of the chains above the cam is controlled by the chain guides 119. The stationary cam and the chain guides tip the carrier so that the pins 118 are horizontal as illustrated in phantom in FIG. 13. The pins engage the openings 50 in the side of the pallet, and as the pallet carrier continues to move the pallet is picked up and carried out of the transfer gate.

The conveyor carries the pallet horizontally toward the front of the equipment to the sprockets 103 and 107, vertically downward to sprockets 105 and 109, then horizontally toward the rear of the equipment. The center of gravity of the pallet and carrier combination is such that the carrier hangs from the chain at an angle which prevents the pallet from dropping off the carrier pins. As the pallet and carrier are moved toward the rear of the equipment the roller 116 of the carrier contacts stationary cam 121 tipping the pallet to a horizontal position. The pallet is carried into a transfer gate where its progress is stopped by a stop 125 while the carrier continues its movement. The pins 118 of the carrier are thus withdrawn from the openings 50 in the side of the pallet and the pallet is released from the carrier. The pallet drops a short distance onto an inclined track of rollers 126 as can best be seen in FIG. 16. The pallet rolls down the rollers onto the return track 67 which carries the pallet from the last section of the equipment to the first section.

*Pallet return track*

The return track 67 is constituted of a series of similar chain conveyors, one in each section of the equipment. The front elevational view of FIG. 16 shows the conveyor in the last section of the equipment and a portion of the conveyor in the adjoining section. The portion of the return track in the last section of the equipment includes two chains 128 and 138. Chain 128 passes around a driving sprocket 129 and two driven sprockets 130 and 131. Chain 138 passes around a driving sprocket 139 and driven sprockets (not shown). The upper portion of the chains 128 and 138 is supported horizontally by guides 147 and 148, respectively.

The chains are continuously driven from shaft 115 which is driven from the main cam shaft 70 as explained hereinabove. A sprocket 137 fixed to shaft 115 engages a chain 135 which in turn engages a sprocket 136 on shaft 134. The shaft 134 transmits rotary motion to the shaft 132 on which the conveyor driving sprockets 129 and 139 are mounted through an angle gear drive 133.

The portion of the return track in the adjoining section is operated from the shaft 140 to which the driven sprockets 130 are attached. A sprocket 141 fixed to the shaft 140 engages a chain 142 which drives the sprocket 143 on the shaft 144. Other sprockets 145 mounted on the shaft 144 drive the chains 146 of this portion of the return conveyor.

The return track consists of a plurality of conveyor sections each being driven by the preceding section. The pallet rolls down the inclined rollers 126 onto the first set of conveyor chains 128 and 138. The chains carry the pallet along and transfer it to the chains 146 of the next section. The pallet is carried from one section to the next along the length of the equipment in the direction opposite to the main track 61 to the end of the return track at the front section of the equipment beneath the beginning of the track 61.

*Pallet return conveyor*

At the first section of the equipment the pallet moves into a transfer gate from which it is picked up by a pallet return conveyor 68 which carries the pallet to the beginning of the main track 61. The return conveyor and the mechanisms associated with it are shown in FIGS. 17, 18, and 19. FIG. 17 is an elevational view from the left side of the first section of the apparatus with portions removed to show the conveyor, the movable transfer gate at which pallets are picked up from the return track by the conveyor, the track loading gate at which pallets are released from the conveyor and transferred to the main track, and portions of the arrangement which drive the conveyor and operate the movable transfer gate. FIG. 18 is a front elevational view showing details of the arrangement for operating the movable transfer gate. FIG. 19 is a plan view of the movable transfer gate at which pallets are picked up from the return track by the conveyor. The gate at which the pallets are released from the return conveyor and transferred to the main track 61 is also shown in the plan view of FIG. 9.

The pallet return conveyor includes two chains 150 and 151. The first chain 150 is supported on sprockets 152, 153, 154, and 155. The other chain 151 is supported on sprockets 161, 162, 163 (a fourth sprocket does not show in the drawings). Sprockets 155 and 163 which are fixed to a shaft 164 are the driving sprockets. The shaft 164 is driven by the cam shaft 70 through sprocket 156, chain 157, sprocket 158, and gears 159 and 160. Suspended between the chains 150 and 151 are a plurality of carriers 165 for carrying pallets by pins 166 which are adapted to engage the openings 50 in the sides of the pallets.

The pallet is carried by the two chains 167 and 168 of the last portion of the return track into a transfer gate 170 as best seen in FIG. 19. The rear chain 167 carries the pallet into the gate until it strikes a stop 190, but the forward chain 168 terminates at the gate and the pallet is supported by rollers 174 of the gate. While a pallet is in position at the gate a pallet carrier 165 carried suspended between the conveyor chains 150 and 151 is cammed to position the pins 166 horizontally by the action of the stationary cam 172 on the carrier roller 171. The height of the conveyor chains above the gate is determined by the horizontal chain guide 173. As the pins of the carrier fully engage the openings 50 in the pallet, the gate 170 is tilted downward out of the path of movement of the pallet and the carrier.

The mechanism which pivots the gate 170 out of the path of the moving pallet includes a bracket 175 on which the gate is mounted. The bracket is one arm of a crank which is pivoted on a shaft 176. A rod 178 is pivotally connected to the other arm 177 of the crank. The other end of the rod 178 is pivotally connected to one end of a rocker arm 180 which rotates about the rocker arm shaft 181. The other end of the rocker arm 180 is biased against a cam 182 by a tension spring 179 which tends to hold the gate 170 in its upper position. The cam 182 which is rotated by the cam shaft 87 causes the gate 170 to be pivoted about the shaft 176 and out of the path of the advancing carrier and returned to position to receive the next carrier from the return track in accordance with the timing chart of FIG. 34.

The pallet is carried by the conveyor horizontally to the sprockets 155 and 163, then vertically upward to sprockets 153 and 162, and then horizontally into the loading gate at the beginning of the track 161. As the carrier moves toward the gate, guides 185 and 186 position the chains vertically while stationary cam 187 acting on carrier roller 171 tips the carrier so that the pallet is horizontal. At the gate the pallet strikes a stop 191, as best seen in the plan view of FIG. 9, which stops the pallet in the gate while the carrier continues to move withdrawing the carrier pins 166 from the opening 50 and releasing the pallet.

A pallet is placed in the gate at the beginning of the main track during the first portion of a dwell period after the pallet previously occupying the gate has been moved to the next position on the track and while the pallet nudging rod 95 is withdrawn. During the last portion of that dwell period, the nudging rod pushes the pallet into contact with the preceding pallet so that it is in position to be engaged by the outrigger pawl 79 during the subsequent index period. The pallet is subsequently moved along the main track 61 a distance equal to its length during each index period by the pallet indexing arrangement.

ORIENTING AND PROCESSING STATIONS

The stations which orient and perform processing operations on the transistors are spaced along the main track 61 as best shown in the overall view of FIG. 7. From the first section of the equipment at the left in FIG. 7 the stations in order are the holder push-down station 52, the first vertical height setting station 53, the horizontal alignment station 54, the second vertical height setting station 56, the first wire bonding station 57, the second wire bonding station 58, the transistor unloading station 59, and the transistor loading station 60.

Each of these stations includes mechanisms for holding a pallet firmly in position at the station during a dwell period while an operation is performed by apparatus at the station. In order to locate the transistor at the bonding station with the high degree of precision necessary for performing the bonding operations, the bonding stations and the transistor orienting stations include mechanisms which cooperate with the registration surface areas of the pallet to obtain precise location of the pallet with respect to the apparatus at the station.

Pallet locating mechanisms

The pallet locating mechanisms at the bonding and transistor orienting stations are illustrated in FIGS. 20, 21, and 21A. FIG. 20 is a right side elevational view showing certain portions of the mechanism acting on a pallet at the station and including the cams which actuate them. FIG. 21 is a plan view showing details of the mechanism for locating the pallet precisely at the station in predetermined horizontal alignment. FIG. 21A is a view taken generally along the line 21A—21A of FIG. 21 but with portions broken away in order to show certain details of the station, the pallet being shown in phantom.

Upon completion of an index period of an operating cycle four lift pins 200 (only two of which can be seen in either FIG. 20 or FIG. 21) lift the pallet 30 off the supporting rollers 72 of the track. The pins are mounted on the pistons of air cylinders 201. The cylinders are operated by air from an air line 203. Air is supplied to the air line 203 from a line 204 by the opening of an air valve 212 which is mounted on a bracket 213 fastened to a stationary shaft 194. The valve is actuated by a cam 214 mounted on the main cam shaft 70 (not shown in FIG. 20, 21, or 21A). The timing of the actuation of the air valve 212 by the cam 214 is in accordance with the timing chart of FIG. 34. A single cam and air valve is sufficient to operate the lift pins at all stations of the equipment having them.

When the air valve 212 is actuated, the lift pins bear against the underside of the base member of the pallet 30 and lift the pallet off the supporting rollers 72 of the track. The upper registration surface areas 32 of the base member are forced against four vertical positioning contacts 202 which are mounted in overhanging plates 208, 215, and 216. The positioning contacts 202 have been precisely preset and the vertical level of each item at the station is established with reference to the contact surfaces. Thus, when the lift pins hold a pallet with its upper registration surface areas in contact with the vertical positioning contacts, the vertical level of these areas is precisely located with respect to the station and its associated mechanisms.

While at the station, fixed horizontal alignment of a pallet is obtained by action of a shot pin 205 having a tapered end portion 206 which mates with the slot 34 in the side of the pallet. The shot pin is biased inward toward the pallet by a compression spring 207. The pin is held away from the pallet or permitted to advance into the slot of the pallet by a cam 217 and linkage arrangement in accordance with the timing chart of FIG. 34. The linkage between the shot pin and cam includes a bearing block 211 fixed to the end of the pin. One end of an arm 209 engages the bearing block and the other end of the arm is fixed to a shaft 210 which is journaled for rotation in a bracket 218. One end of another arm 219 is fixed to the shaft 210 and its other end is pivotally connected to the end of a rod 221. The other end of the rod 221 is pivotally connected to a rocker arm 222. The rocker arm 222 pivots about a rocker arm shaft 193, and a cam follower at the opposite end of the rocker arm engages the cam 217. The shaft 210 extends along the length of the equipment and at each station an arm 209 is fixed to the shaft to operate a shot pin.

At the station the shot pin 205 is positioned horizontally by the converging surfaces of a supporting slide 223. The pin is urged against the supporting slide by the action of compression springs 231. The compression springs act on a pressure pad 232 which carries two horizontal rollers 234. The rollers bear against a flat surface 233 along the side of the pin 205 and urge the pin against the surface of the slide 223. Thus, the horizontal position of the shot pin along the direction of the main track 61 is accurately set by the bearing surfaces of the supporting slide 223.

As the shot pin 205 advances toward the pallet during a dwell period, the rollers 234 guide the pin and urge it against the surfaces of the supporting slide 223. The tip 206 of the pin is tapered so that it engages the converging vertical registration surface areas defining the slot 34 in the side of the pallet. The force of the compression spring 207 causes the shot pin to urge the pallet toward the rear of the equipment so that the vertical registration surface area 33 along the opposite side of the pallet bears against horizontal positioning contacts 220. The horizontal positioning contacts 220 have been precisely preset so that the vertical registration surface area 33 of the pallet is accurately positioned in a direction normal to the main track 61. The configuration of the tip of the shot pin bearing against the converging vertical registration surface areas of the pallet slot urges the pallet either slightly forward or backward along the direction of movement of the track to place the pallet in precise position along that direction with respect to the bearing surfaces of the supporting slide 223.

Thus, the registration surface areas of a pallet are precisely located at the station by the positioning contacts in cooperation with the bearing surfaces of the shot pin supporting slide. All other items at the station are positioned with reference to these elements. Stations other than the orienting and bonding stations do not require such precise positioning of the pallet. At these stations a shot pin locates the pallet with sufficient accuracy and locks the pallet at the station preventing movement during a dwell period.

Transistor loading and unloading station

A transistor is placed in the holder of a pallet at the loading station 59 while the collet of the pallet holder is automatically opened during the dwell period to receive the transistor. Both the transistor unloading station 59 and the transistor loading station 60 are located adjacent the end of the main track. The loading station is the starting point for each transistor being processed in the equipment and might logically be located at the beginning of the track. However, the action of opening a collet is identical for both stations, and therefore a single mechanism can be employed to serve both stations. The mechanism for opening the collets at the transistor loading and unloading stations is illustrated in FIGS. 22 and 23. FIG. 22 is a front elevational view of the mechanism and FIG. 23 is a left side elevational view partially broken away to show certain details. Additional details of the pallets can be seen in FIGS. 2–6.

While the pallets 30 are in position at the stations during a dwell period, the collets are forced upward by studs 261 bearing against the underside of the collets 38. The studs are mounted on a bar 262 which is fastened to a rod 263 by a connecting sleeve 264 and a shearable pin 265. The rod is journaled for axial movement in a supporting sleeve 266 which is fixed to the frame of the equipment, and rotation is prevented by a key 267. The lower end of the rod 263 is fastened to a cam follower which engages a cam 268 rotated by the main cam shaft 70.

As the studs 261 push against the underside of the collets 38, the pallets are held down by two overhanging plates 248 and 249. The collets are moved upward with respect to the sleeves 38 of the pallet holders permitting the collet segments to diverge. While the collet of the pallet at the unloading station is open, an operator may removed the processed transistor 10 and while the collet of the pallet at the loading station is open, an operator can insert a transistor 10 to be processed. As the studs 261 are lowered, the compression springs 40 cause the collets to recede in the sleeves 38 thus locking the transistor in the holder of the pallet at the loading station. The collets are opened and closed during an operating cycle of the equipment in accordance with the timing chart of FIG. 34.

*Holder push-down station*

After a transistor has been loaded into the holder of a pallet at the loading station 60, the pallet is carried to the beginning of the main track by the pallet removing conveyor 66, the return track 67, and the pallet return conveyor 68. The pallet is then adavnced along the main track passing through each station in sequence. The first station occupied by the pallet and transistor is the holder push-down station 62 shown in FIGS. 24 and 24A. FIG. 24 is a right side elevational view illustrating the mechanism at the station, and FIG. 24A is an enlarged view from the front showing certain details of the transistor and the mechanism. At this station the holder 37 supporting the transistor 10 is pushed downward to place the holder and transistor at a level with respect to the pallet below that at which it is desired to set them at subsequent stations. This operation removes the effects of any previous operations on the holder, particularly the upward force applied to the collet at the loading station 60.

During the dwell period after a pallet has been moved into the station, the shot pin 205 moves into the slot in the pallet and forces the other side of the pallet against the horizontal positioning contacts 220 thus holding the pallet firmly in the station in proper horizontal alignment. The pallet continues to be supported on the supporting rollers 72 which maintain the vertical level of the pallet during the dwell period while it is located at the station.

A push-down member 225 as best shown in the detailed view of FIG. 24A is then moved downward against the upper surface 14 of the transistor 10. The configuration of the push-down member is such that the leads and semiconductor die are protected from damage. The push-down member is mounted at one end of a lever arm 226 which is pivoted at its midpoint about a bracket 227. The other end of the lever arm is fastened to one end of a rod 228 which has its other end connected to a rocker arm 229. The rocker arm is pivoted on the rocker arm shaft 194 and a cam follower on the end of the rocker arm engages a cam 230 mounted on the main cam shaft 70.

The push-down member 225 is moved downward by the action of the cam in accordance with the timing chart of FIG. 34. The downward force on the push-down member 225 overcomes the frictional force of the pressure pad 29 on the holder 37 exerted by the compression spring 43 (see FIG. 5) and the transistor and holder are moved downward. An arrangement at the upper end of the rod 228 prevents over-travel of the push-down member 225. Excess upward movement of the rod 228 with respect to the member 225 and the lever arm 226 compresses a spring 235 between a flanged sleeve 236 and a collar 237 which is fixed to the rod 228 by a pin 238.

*Height setting station*

After the transistor and holder have been positioned to a low point at the holder push-down station, the pallet proceeds to the first vertical height station 53 illustrated in FIGS. 25, 25A, and 25B. At this station the holder is pushed upward until the stripes on the upper surface of the semiconductor die of the transistor attain a precisely predetermined level with respect to the horizontal registration surface areas of the base member of the pallet. FIG. 25 is a right side elevational view of the mechanisms at the station. FIG. 25A is an enlarged view partially in cross-section showing details of the mechanism for sensing the height of the transistor, and FIG. 25B is an enlarged view in cross-section of a portion of the mechanisms for pushing up the transistor holder.

After the pallet has entered the station, it is lifted by the lift pins 200 placing the horizontal registration surface areas against the vertical positioning contacts 202. The shot pin 205 engages the slot in the pallet and places the side of the pallet against the horizontal positioning contacts 220. Thus, the registration surface areas of the pallet are precisely oriented with respect to the positioning contacts and apparatus at the station.

Apparatus at the station includes a height sensing mechanism 240 employing a gauge 241 which utilizes air pressure to measure distance. The air gauge 241 is a well-known device in which air from a supply 257 carried by an air line 258 to the gauge is forced out an orifice at the tip of the gauge against a surface. The proximity of the surface to the tip provides a back pressure affecting the air pressure within the gauge. This pressure can be utilized to provide very precise measurement of the distance between the surface and the tip of the gauge. The pressure in the gauge is applied by an air line 259 to a pressure sensitive electrical switch 260, the purpose of which will be explained below.

As best seen in the detailed view of FIG. 25A the distance between the tip of the gauge 241 and the upper surface of the semiconductor die 25 is not measured directly but through an intervening feeler rod 312 having a plate 313 at its upper end which confronts the tip of the gauge with a flat uniform surface. The feeler rod is supported so as to permit vertical movement in a bracket 314 which is fixed to the gauge mounting platform 242.

The gauge mounting platform 242 is pivoted at one end to a bracket 243. The other end of the platform 242 is connected to a rod 244. One end of a rocker arm 245 which is pivoted at its midpoint to the rocker arm shaft 196 is connected to the rod 244. The other end of the rocker arm 245 carries a cam follower which engages a cam 246 fixed to the main cam shaft 70.

As can be seen from the timing chart of FIG. 34 the height sensing unit is lowered by the cam 246 during the first portion of each dwell period to place the gauge in proper position. The height of the gauge tip above the horizontal registration surface areas of the pallet is determined by a stop 247 which bears against an adjustable stop 239 in the gauge platform 242. Movement of the sensing unit after the stops 239 and 247 come in contact is prevented by an over-travel arrangement at the lower end of the rod 244. Excess downward movement of the pivot connection 296 to the rocker arm 245 compresses a spring 297 between a flanged sleeve 298 fixed to the connector and a collar 299 which is fixed to the rod 244 by a pin 300. When the height sensing unit is in its lowered position the feeler rod plate 313 rests on the bracket 314 and the lower tip of the feeler rod 312 is slightly above the surface of the semiconductor die 25.

Apparatus at the station also includes a holder push-up mechanism having a push-up member 250 which contacts the underside of the pallet holder 37 at the flange of the sleeve 39 (see FIGS. 2 through 6). The push-up member 250 has a central cavity to accommodate the lower end of the collet 37. The push-up member 250 is mounted on the upper end of a rod 301 which is journaled for vertical movement in a supporting sleeve 302. The rod 301 and push-up member are raised by the action of a rotating cam 254 fixed to the main cam shaft 70. The cam 254 is engaged by a cam follower at the end of a rocker arm 253 which is pivotally mounted on a rocker arm shaft 194. A plate 303 fixed to the rocker arm 253 is pivotally conected to a driving link 252.

The arrangement connecting the driving link 252 to the rod 301 is shown in detail in FIG. 25B. A mounting 251 which supports a rotary solenoid 255 is fixed to the link 252. The solenoid has an armature 256 which is normally held in its retracted position as shown in phantom in FIG. 25B. The armature is advanced upward as shown in full in FIG. 25B by electrical current supplied from a power supply 311 over leads 304 when the switch 260 is closed. A link 305 having a sleeve portion 306 which is adapted to receive the solenoid armature 256 is pivotally connected to the lower end of the rod 301. Also in the sleeve are two hardened steel cylinders 307 and 308 having a hardened steel ball 309 positioned between them. The upper cylinder 307 abuts a shoulder 310 at the upper end of the sleeve 306.

The mechanisms at the station operate in the following manner in accordance with the timing chart of FIG. 34. After a pallet has been moved into the station during an index period, it is properly oriented and locked in position by the lift pin and shot pin mechanisms. The height sensing unit is lowered to position the top of the air gauge 241 over the semiconductor die of the transistor at a precise vertical level with respect to the horizontal registration surface areas of the pallet. The air pressure within the gauge 241 is such that it maintains the pressure sensitive switch 260 in the closed position and the solenoid 255 is energized. The lower end of the feeler rod 312 is slightly above the upper surface of the semiconductor die 25.

In accordance with the timing chart of FIG. 34 the cam 254 causes upward movement of the driving link 252 which is transmitted to the push-up member 250 by means of the solenoid mounting 251, the solenoid 255, the solenoid armature 256 in its advanced position, the lower cylinder 308, the ball 309, the upper cylinder 307, the link 305, and the rod 301. The push-up member is raised rapidly at first until the spacing required for clearance is overcome and then at a relatively slow rate. The push-up member contacts the underside of the holder 37 and forces the holder upward overcoming the frictional effect of the pad 29 under the force of the spring 43. (See FIG. 5.)

When the holder 37, transistor 10, and the feeler rod 312 have been raised so that the upper surface of the plate 313 is separated from the tip of the air gauge 241 by a predetermined distance, a back pressure builds up in the gauge sufficient to trigger the pressure sensitive switch 260 to its open position. The solenoid 255 is immediately de-energized and the armature 256 is retracted (as indicated by the phantom line in FIG. 25B), thus producing a gap in the elements transmitting motion from the cam 254 to the push-up member 250.

In effect, the push-up member is disconnected or uncoupled from the cam and despite continued upward movement of the driving link 252, solenoid mounting 251, and solenoid 255, the pallet holder does not move any farther. The distance of retraction of the armature 256 is such as to insure that the spacing between the upper surface of the retracted armature and the shoulder 310 of the sleeve 306 is greater than the distance occupied by the two cylinders 307 and 308 and the ball 309 plus the additional distance the cam moves the solenoid and armature during the remainder of the operating cycle. Since the driving link 252 moves upward a total distance of about .025 inch after the push-up member 250 contacts the underside of the previously pushed-down holder 37 and since the armature retracts about $\frac{1}{16}$ inch, adequate clearance after retraction is assured. At the first height setting station 53 the holder 37 is usually raised about .010 inch in order to set the upper surface of the semiconductor die at the desired level. The apparatus consistently sets the level of the upper surface of the die to the desired level within a tolerance of $50 \times 10^{-6}$ inch.

*Horizontal alignment station*

After the upper surface of the transistor semiconductor die has been precisely set at a predetermined vertical level with respect to the horizontal registration surface areas of the pallet in the height setting station 53 it is advanced along the main track to the horizontal alignment station 54 illustrated in FIGS. 26, 27, 28, 29, 30 and 31. At this station the pallet holder is maneuvered horizontally to orient the transistor stripes precisely with respect to the vertical side registration surface area and the converging vertical side registration areas on the base member of the pallet. The mechanisms at this station include wrenches which are automatically actuated to loosen the bolts clamping the holder in the pallet thereby permitting horizontal movement of the holder and which subsequently are actuated to tighten the bolts to lock the holder in the pallet. The station also includes mechanism by which an operator is enabled to manipulate the holder and place the transistor stripes in the desired horizontal alignment with respect to the vertical registration surface areas of the pallet.

FIG. 26 is a front elevational view showing details of the mechanism for loosening and tightening the bolts of the pallet. FIG. 27 is a view from the left showing portions of this mechanism. After the pallet enters the station, it is lifted by lift pins 200 so that the upper registration surface areas of the pallet bear against the vertical positioning contacts 202. The shot pin 205 engages the converging vertical registration surface areas defining the slot in the side of the pallet and urges the opposite side of the pallet against the horizontal positioning contacts 220. The pallet is thus firmly held in precise orientation with respect to the apparatus at the station. In addition, the transistor is at a precise vertical level with respect to the station by virtue of the operation performed at the height setting station.

In order for the holder 37 to be moved horizontally with respect to the base member of the pallet, the bolts 45 and 46 which clamp the retaining plate 44 against the holder mounting 42 (see FIGS. 2–6) must be loosened. The mechanism which accomplishes this operation includes two socket wrenches 270 and 271 which are held in a lowered position during the index period and are raised into position engaging the bolt heads and then rotated to loosen the bolts in accordance with the timing chart of FIG. 34.

The wrenches 270 and 271 are mounted on rods 272 and 273, respectively, which are journaled for vertical movement and for rotational movement in a fixed support 274. The rods are mounted in a moveable support 276 by means of retaining rings 315 and 316 and a compression spring 317. This mounting arrangement permits rotation of the rod while providing vertical support. Vertical movement of the rod with respect to the moveable support 276 is possible by compressing the spring 317.

The moveable support 276 is mounted on the upper end of a rod 277 and is journaled for vertical movement along guide rods 318 and 319. The lower end of the rod 277 is connected to one end of a rocker arm 278 which is pivotally mounted on a rocker arm shaft 196. The other end of the rocker arm 278 carries a cam follower which engages a constraining cam 279 fixed to the main cam shaft 70. The rotation of the cam 279 raises and lowers the wrenches 270 and 271 into and out of engagement with the pallet bolts 45 and 46 in accordance with the timing chart of FIG. 34.

In order for the wrenches 270 and 271 to loosen and tighten the bolts 45 and 46 the rods 272 and 273 are rotated in opposite directions, since one bolt 46 has a right hand thread and the other bolt 45 a left hand thread. The lower portion 320 of the rod 273 (shown in FIG. 27) has a square cross-section. The spare portion 320 of the rod mates with a square opening through a gear mounting 321 to which is fixed a bevel gear 280. Thus, the rod 273 moves vertically independently of the gear 280, but rotates with it. A bevel gear 281 fixed to a horizontal shaft 282 meshes with the bevel gear 280. The shaft 282 is mounted for rotation in a housing 322. A similar arrangement (not seen from the drawings) connects the other rod 272 to a horizontal shaft 283.

Fixed to the shafts 283 and 282 are arms 284 and 285 which are pivotally connected to the ends of rods 286 and 287, respectively. The rods 286 and 287 are attached to the pistons of air cushioning cylinders 288 and 289, respectively. Rods 290 and 291 are fixed to the bodies of the cylinders 288 and 289. The lower ends of the rods 290 and 291 are pivotally connected to opposite ends of a member 293. The member 293 is fixed to one end of a rocker arm 292 which pivots on rocker arm shaft 195. The other end of the rocker arm 292 carries a cam follower which engages a constraining cam 294 fixed to the main cam shaft 70.

Air is supplied to the air cushioning cylinders 288 and 289 by an air line 323 when an air valve 324 is opened by the action of a cam 325 fixed to the main cam shaft 70. Air under pressure is constantly supplied to the valve inlet through an air line 326. As can be seen in FIG. 27 which shows the details of air cylinder 289 (cylinder 288 is identical) when the body of the cylinder is moved downward, the piston 327 contacts the upper end of the body and moves downward with it. When the body of the cylinder is moved upward, the piston 327 tends to move with it only so long as the force on the lower surface of the piston due to pressure within the cylinder is greater than the force exerted downward by the rod 27.

The wrenches 270 and 271 are raised and rotated to loosen the pallet bolts 45 and 46 by the cams 279 and 294, respectively, during the first portion of each dwell period, and are rotated to tighten the pallet bolts and then lowered by the cams during the last portion of the dwell period in accordance with the timing chart of FIG. 34. First, the wrenches 270 and 271 are moved upward to engage the bolts 45 and 46. Compression springs 317 absorb any excessive movement of the moveable support 276. Furthermore, if either or both bolts are oriented so that a wrench does not engage, the spring 317 is compressed, and when the wrench is rotated sufficiently to align the wrench properly with the bolt, the wrench is urged into engagement.

Cam 294 causes the bodies of the cylinders 288 and 289 to lower. During this time although the air valve 324 is closed, the interiors of the cylinders contain air which is sufficient to support the pistons 327 and the upper rods 286 and 287. The pistons and attached rods 286 and 287 are carried downward with the cylinders thereby turning shafts 283 and 282 in opposite directions. The rods 272 and 273 and the wrenches 270 and 271 attached to the rods are thereby turned loosening the left hand threaded pallet bolt 45 and the right hand threaded pallet bolt 46, respectively.

The mechanism thus loosens the retaining plate 44 of the pallet (see FIGS. 2–6) permitting the holder 37 and holder mounting 42 to be moved horizontally. During the last portion of the dwell period, after the holder has been properly aligned horizontally, the bolts are retightened and the wrenches lowered from engagement with the bolts. While the rocker arm 292 and member 293 carry the rods 290 and 291 upward, the air valve 324 is opened placing the cylinders 288 and 289 under pressure.

Because of the force of the air pressure on the pistons, the rods 286 and 287 move upward with the lower rods 290 and 291 thereby rotating the wrenches 270 and 271 and tightening the bolts 45 and 46. The lower rods 290 and 291 are carried upward beyond their starting position to insure that the bolts will be tightened securely. The amount of torque applied to the bolts is regulated by the air under pressure in the cylinders and not by the distance of movement of the lower rods 290 and 291.

After the bolts have been tightened, the air pressure in the cylinders 288 and 289 is released to eliminate forces tending to rotate the rods 272 and 273 and wrenches 270 and 271. Cam 279 then lowers the moveable support carrying the rods 272 and 273 downward and moving the wrenches out of engagement with the bolts and clear of the pallet. During the subsequent index period the air pressure is re-applied to the cylinders 288 and 289 for an instant to move the upper rods 286 and 287 upward to their fullest extent with respect to the bodies of the cylinders. At the same time the cam 294 rotates the wrenches slightly in a loosening direction to reset the mechanism to its starting position.

The manipulating mechanism by which the transistor 10 is aligned horizontally with respect to the vertical registration surface areas of the pallet 30 is illustrated in FIGS. 28, 29, 30, and 31. FIG. 28 is a plan view of the mechanism with portions broken away to show certain details. FIG. 29 is a right side elevational view of the mechanism with portions broken away. FIG. 30 is a front elevational view partially in cross-section showing a portion of the mechanism. FIG. 31 is a front elevational view in cross-section showing a particular detail of the mechanism.

Subsequent to the accurate positioning of the pallet in the station and the loosening of the bolts 45 and 46 clamping the pallet holder mounting 42 between the base member 31 and the retaining plate 44 (see FIGS. 2–6) the jaws of a manipulator clamp 340 grip the holder mounting 42 in accordance with the timing chart of FIG. 34. The jaws which are normally biased open by a spring 339 are caused to grip the holder mounting by an air cylinder 341 actuated by pressure in an air line 342. Air under pressure is supplied from an air line 343 to the air line 342 and cylinder 341 by the actuation of an air valve 344 by a cam 345 fixed to the main cam shaft 70 and shown in FIG. 26.

The clamp 340 is mounted on the bridging portion of an H-shaped movable plate 346. Each arm 347 and 348 of the plate 346 rides horizontally between two sets of ball bearings 349 and 350, and 351 and 352. The lower sets of bearings are supported on fixed plates 353 and 354 and the other sets are urged against the movable plate by spring 355 acting against the plate 356 and 357 thereby permitting the H-shaped plate 346 to move in a horizontal plane. The movable plate 346 is connected to a horizontal shaft 360 and the shaft in turn is connected to a control handle 361 in such a way that when the handle is moved up or down as seen in FIG. 29, the shaft 360 moves along the direction of its axis and the plate 346 moves normal to the direction of the main track. When the handle 361 is moved to the right or left as seen in FIG. 28, the shaft 360 rotates and the plate 346 moves in a direction normal to the axis of the shaft and parallel to the direction of the main track.

The manipulating handle 361 and rod 362 are connected to the horizontal shaft 360 by a double yoke pivoting arrangement which may best be understood by reference to the detailed cross-sectional view of FIG. 31 and the appropriate portion of FIG. 28, also shown in cross-section. The rod 362 is fixed to a vertical yoke 363 which is supported by pivots 364 and 365 to a block 366 fixed to the end of the shaft 360. The rod 362 is mounted over the central axis of the shaft 360 and the block 366 and the pivots 364 and 365 are on a line which is normal to and intersects the axis of the shaft. The vertical yoke 363 is supported in a horizontal yoke 367 by pivots 368 and 369 which are on a line parallel to but lower than the line through the first set of pivots 364 and 365. The horizontal yoke 367 is fixed to a shaft 370 having its axis in line with the axis of the shaft 360. The horizontal yoke shaft 370 is mounted in a bearing support 371 so as to permit rotation of the shaft and yoke while preventing axial movement.

The above described arrangement connecting the handle 361 to the horizontal shaft 360 permits both rotation and axial movement of the shaft by manipulation of the handle. As the handle is moved to the right or left both the vertical and horizontal yokes rotate about the axis of the horizontal shaft 360 and the shaft 370 thereby rotating the horizontal shaft. The two yokes 363 and 367 and the shaft 360 do not change their positions with respect to each other.

Movement of the manipulating handle forward or backward (or upward or downward) causes the vertical yoke 363 to rotate about the pivots 368 and 369 supporting it in the horizontal yoke 367, while the horizontal yoke does not move. Since the pivots 364 and 365 connecting the block 366 and horizontal shaft 360 to the vertical yoke 363 are offset from the other pivots 368 and 369, the block 366 and the horizontal shaft 360 are moved axially.

The arrangement by which the rotational movement and the linear axial movement of the horizontal shaft 360 is translated into linear movement of the movable plate 346 parallel to the main track and normal to the main track, respectively, is most clearly shown in FIGS. 28 and 30. A bifurcated connecting link or plate 372 is connected to the horizontal shaft 360 by means of a thin sheet of flexible spring steel 373 which is clamped to the link and to the shaft. The movable plate 346 supporting the clamp 340 is fixed to a member 376 which is connected to the link 372 by means of two thin sheets of flexible spring steel 374 and 375 clamped to the link and to the member.

The thin sheets or strips of spring steel 373, 374, and 375 are sufficiently flexible to permit bending when subjected to fairly small bending moments. However, they are rigid to forces acting parallel to their major surfaces. Thus, rotation of the horizontal shaft 360 pulls or pushes the movable plate 346 in a horizontal plane toward or away from the shaft while the short unclamped spans of the strips 373, 374, and 375 permit the vertical attitude of the link 372 to adjust freely to the forces applied to it. Axial movement of the horizontal shaft 360 is transmitted directly to the movable plate 346 since the link 372 and steel strips 373, 374, and 375 are all substantially rigid to forces acting in this direction.

The mechanism is a micromanipulator in which large movements of the handle 361 are translated into relatively small movements of the movable plate 346 and holder 340. It is desirable for the clamp 340 to be movable over a locus having a diameter of .025 inch and to be positioned within a tolerance of about .0003 inch. These specifications require rotation of the horizontal shaft 360 for a total angular displacement of about 15°. The system provides a ratio of movement of 100 to 1 of the handle 361 with respect to the clamp 340. It has been found that the stripes can be positioned consistently with an accuracy of .0001 inch, well within the required tolerance.

During the portion of a dwell period that the clamp 340 grips the holder 42 of the pallet as shown in the timing chart of FIG. 34 an operator may maneuver the clamp by means of the handle 361 to place the transistor 10 in desired horizontal alignment with respect to the vertical registration surface areas of the pallet. An optical system 377 (only a portion of which is shown in the drawings) projects an image of the upper surface of the transistor onto a viewer 62 (shown in FIG. 7) which enlarges 200 times. Since the vertical level of the transistor surface was set precisely at the first height setting station 53, the transistor stripes are in proper focus. The operator moves the controlling handle 361 to properly position the enlarged image of the transistor stripes with respect to a precisely located reticle on the viewer. During the last portion of the dwell period the wrenches tighten the pallet bolts 45 and 46 and the cam 345 causes the clamp 340 to release the pallet. In this way the horizontal alignment of the transistor stripes is precisely set and fixed with respect to the vertical registration surface area of the pallet.

*Contact wire bonding station*

After the transistor has been oriented to place it in proper horizontal alignment with respect to the vertical registration surface areas, the pallet is subsequently moved to the second vertical height setting station 56. This station is similar to the first vertical height setting station 53. At this station the height of the transistor is set at a slightly higher level with respect to the horizontal registration surface areas of the pallet (.010 inch above the level set at the first height setting station 53) to insure that any change which may have occurred in the vertical level of the transistor while at the horizontal alignment station is obviated.

The pallet then proceeds to the first bonding station 57 at which a contact wire 18 is bonded to the base stripe 27 and to the appropriate lead 20. Next, the pallet enters the second bonding station 58 at which another contact wire 19 is bonded to the emitter stripe 28 and to the appropriate lead 21. A third vertical height setting station may be provided between the two bonding stations in order to raise the upper surface of the semiconductor die a few mils above the level previously established and insure greater accuracy of the vertical level of the stripes at the second bonding station. The two wire bonding stations are similar as to the mechanisms provided and their function and the method of operation. For purposes of illustration, the second bonding station 58 is shown in FIGS. 32, 33, and 33A. FIG. 32 is a plan view showing a pallet in location at the bonding station 58 and portions of some of the apparatus at the station. FIG. 33 is a right side elevational view showing portions of the apparatus at the station. FIG. 33A is an enlarged view from the right showing details of the transistor and portions of the bonding apparatus.

During the first portion of the dwell period after the pallet has been moved into the bonding station the lift pins 200 lift the pallet from the track placing the horizontal upper registration surface areas of the pallet against the vertical positioning contacts 202. The shot pin 205 engages the converging vertical registration surface areas defining the slot in the pallet and forces the opposite vertical registration surface area into contact with the horizontal positioning contacts 202. The pallet is thus firmly held at its processing location with the registration surface areas in precise orientation with respect to the apparatus at the station. Furthermore, since the transistor stripes were previously aligned horizontally with respect to the vertical registration surface areas of the pallet at the horizontal alignment station 54, and since the vertical level of the upper surface of the transistor semiconductor die was properly set with respect to the horizontal registration surface areas of the pallet, the transistor stripes are located in precisely predetermined horizontal alignment and at a precisely predetermined vertical level with respect to the processing apparatus at the bonding station.

At the wire bonding station as can best be seen in the detailed view of FIG. 33A a short length of wire 19 is carried into position adjacent the upper surface of the transistor by wire transfer jaws 382. Then bonding tools 380 and 381 are lowered compressing one end of the contact wire 19 between the tip of one bonding tool 380 and the emitter stripe 28 and compressing the other end of the contact wire between the tip of the other bonding tool 381 and the upper surface of the emitter lead 21. Heat is applied to the bonding tools 380 and 381 and to the transistor. The contact wire 19 thereby becomes thermal compression bonded to the emitter stripe 28 and to the emitter lead 21. The contact wire 18 between the base stripe 27 and the base lead 20 was previously bonded at the first wire bonding station 57.

The width of each stripe 27 and 28 as seen in FIG. 33A is approximately 1 mil and the stripes are separated by a distance of about 1 mil. In order to achieve a proper bonded connection between the contact wire 19 and the stripe 28, the transistor must be positioned at the work area within the bonding station so that the stripe is within .0003 inch of the optimum position with respect to the bonding tool. This tolerance is within the degree of accuracy obtainable in orienting the transistor with respect to the registration surface areas of the pallet at the horizontal alignment station 54 as explained previously.

Portions of the mechanisms which support and operate the bonding tools and wire transfer jaws are illustrated generally in FIGS. 32 and 33. The wire transfer jaws 382 are carried at the end of arm 383 which pivots about the axis of a horizontal supporting arm 384 to place the jaws in either the lower position adjacent the transistor or an upper position. When the jaws are in the upper position they are in cooperative association with a wire feeding mechanism 385 (indicated only generally in FIG. 32) which places a length of contact wire 19 in the jaws. The bonding tools 380 and 381 are fixed to the ends of arms 386 and 387 which are mounted on a pivoting shaft 388. The wire transfer jaws 382 and the bonding tools 380 and 381 are actuated by the main cam shaft through appropriate mechanisms 389 and 390, only the housings of which are indicated partially in FIGS. 32 and 33. The operating sequence of the jaws and bonding tools is in accordance with the timing chart of FIG. 34.

Subsequent to the final bonding operation the pallet passes from the second bonding station 58 to the transistor unloading station 59. The mechanism at this station operates as explained previously to open the collets 38 of the holder 37 and permit the transistor with contact wires attached to be removed from the pallet.

What is claimed is:

1. Apparatus for placing an article in a work area in a predetermined position with respect to the work area including in combination
   a pallet comprising
   a base member having registration means thereon,
   a holder movable along its vertical axis and in a horizontal plane with respect to the base member and adapted to receive an article,
   vertical holding means for maintaining the holder in position along its vertical axis with respect to the base member, and
   fastening means for maintaining the holder in fixed position in a horizontal plane with respect to the base member;
   a first positioning station including means for moving the holder in a horizontal plane with respect to the base member to position the article in predetermined horizontal alignment with respect to the registration means on the base member;
   means at said first positioning station for releasing said fastening means to permit movement of the holder with respect to the base member and for securing said fastening means whereby the holder is maintained in fixed position in a horizontal plane with respect to the registration means on the base member;
   a second positioning station including means for overcoming the vertical holding means and moving the holder vertically with respect to the base member to position the article at a predetermined vertical level with respect to the registration means on the base member; and
   a work station having a work area and including means cooperating with said registration means for locating the base member with said registration means in predetermined horizontal alignment and at a predetermined vertical level with respect to said work area whereby the article positioned in predetermined horizontal alignment and at a predetermined vertical level with respect to the registration means is located in predetermined horizontal alignment and at a predetermined vertical level with respect to the work area.

2. Apparatus for delivering an article to a work area in a predetermined position with respect to the work area including in combination
   a pallet comprising
   a base member having registration means thereon,
   a holder mounting supported in said base member and movable in a horizontal plane with respect to the registration means,
   releasable fastening means for maintaining the holder mounting in fixed position with respect to the registration means,
   a holder supported by said holder mounting and movable along its vertical axis with respect to the holder mounting and the registration means and adapted to receive an article, and
   friction means for maintaining the holder in position along its vertical axis with respect to the holder mounting and the registration means;
   a loading station including means for supporting the pallet while an article is placed in the holder;
   a first vertical positioning station including means for overcoming said friction means and moving the holder vertically with respect to the registration means to position the holder at a predetermined vertical level with respect to the registration means;
   a horizontal positioning station including means for moving the holder mounting and holder in a horizontal plane with respect to the registration means to position the article in predetermined horizontal alignment with respect to the registration means;
   means at said horizontal positioning station for releasing said fastening means to permit movement of the holder mounting with respect to the registration means and for securing said fastening means whereby the holder mounting is maintained in fixed position with respect to the registration means;
   a second vertical positioning station including means for overcoming said friction means and moving the holder vertically upward with respect to the registration means to position the article at a predetermined vertical level with respect to the registration means;
   a work station having a work area and including means cooperating with said registration means for locating the base member with said registration means in predetermined horizontal alignment and at a predetermined vertical level with respect to said work area whereby the article positioned in predetermined horizontal alignment and at a predetermined vertical level with respect to the registration means is located in predetermined horizontal alignment and at a predetermined vertical level with respect to the work area;
   an unloading station including means for supporting the pallet while the article is removed from the holder; and
   conveying means for moving the pallet to each of said stations in succession.

3. Apparatus for delivering an article to a work area in a predetermined position with respect to the work area including in combination a pallet comprising
a base member having registration means thereon,
a holder mounting supported in said base member and movable in a horizontal plane with respect to the base member,
releasable fastening means for maintaining the holder mounting in fixed position with respect to the base member,
a holder supported in said holder mounting and movable along its vertical axis with respect to the holder mounting and adapted to receive an article, and
friction means for maintaining the holder in position along its vertical axis with respect to the holder mounting;
a plurality of stations adapted to receive the pallet;
conveying means for moving the pallet to each of said stations in succession;
driving means;
means operatively connected to the driving means for actuating the conveyor means to move the pallet to a station, permit the pallet to remain at the station during a dwell period, and move the pallet from the station;
a first of said plurality of stations being a loading station and including means for supporting a pallet located at the station during a dwell period while an article is placed in the holder;
a second of said plurality of stations being a vertical positioning station and including means operatively connected to said driving means for overcoming said friction means and moving the holder of a pallet located at the station during a dwell period vertically downward with respect to the holder mounting to position the article at a predetermined vertical level with respect to the registration means on the base member;
a third of said plurality of stations being a horizontal positioning station and including manually operable means for moving the holder mounting of a pallet located at the station during a dwell period in a horizontal plane with respect to the base member to position the article in predetermined horizontal alignment with respect to the registration means on the base member;
means at said horizontal positioning station operatively connected to said driving means for engaging the releasable fastening means of a pallet located at the station during a dwell period and for releasing the releasable fastening means whereby movement of the holder mounting with respect to the base member is permitted and for securing the releasable fastening means whereby the holder mounting is maintained in fixed position with respect to the registration means on the base member;
a fourth of said plurality of stations being a vertical positioning station and including means operatively connected to said driving means for overcoming said friction means and for moving the holder of a pallet located at the station during a dwell period vertically upward with respect to the holder mounting to position the article at a predetermined vertical level with respect to the registration means on the base member;
a fifth of said plurality of stations being a work station having a work area and including means cooperating with said registration means for locating the base member of a pallet located at the station during a dwell period with the registration means in predetermined horizontal alignment and at a predetermined vertical level with respect to the work area whereby the article positioned in predetermined horizontal alignment and at a predetermined vertical level with respect to the registration means is located in predetermined horizontal alignment and at a predetermined vertical level with respect to the work area; and
a sixth of said plurality of stations being an unloading station and including means for supporting a pallet located at the station during a dwell period while the article is removed from the holder.

4. Apparatus for placing an article in a work area in a predetermined position with respect to the work area including in combination
a pallet comprising
a base member having horizontal upper registration surface areas, a vertical side registration surface area on one side of the base member, and a slot on the opposite side of the base member defined by converging vertical registration surface areas,
a holder movable along its vertical axis and in a horizontal plane with respect to the base member and adapted to receive an article,
vertical holding means for maintaining the holder in position along its vertical axis with respect to the base member, and
releasable fastening means for maintaining the holder in fixed position in a horizontal plane with respect to the base member;
a horizontal positioning station including
fixed vertical contacts adapted to be contacted by the horizontal upper registration surface areas of the base member of a pallet located at the station to locate the pallet at a predetermined vertical level with respect to the station,
pallet raising means for lifting a pallet located at the station to bring said upper registration surface areas of the base member into contact with said fixed vertical contacts,
fixed horizontal contacts adapted to be contacted by the vertical side registration surface area of the base member of a pallet located at the station to locate the pallet in predetermined horizontal alignment in one direction with respect to the station,
a moveable horizontal contact member adapted to engage the slot in the base member of a pallet located at the station and mate with said converging vertical registration surface areas and adapted to move the pallet horizontally to bring said vertical side registration surface area of the base member into contact with said fixed horizontal contacts thereby locating the pallet in fixed position in a horizontal plane with respect to the station,
means for releasing said fastening means to permit movement of the holder with respect to the base member and for securing said fastening means to maintain the holder in fixed position in a horizontal plane with respect to the base member, and
horizontal positioning means adapted to engage the holder and adapted to be manually operable to move the holder in a horizontal plane with respect to the base member while said fastening means are released and to position the article in predetermined horizontal alignment with respect to said vertical side registration surface area and said converging vertical registration surface areas;
a vertical positioning station including
fixed vertical contacts adapted to be contacted by the horizontal upper registration surface areas of the base member of a pallet located at the station to locate the pallet at a predetermined vertical level with respect to the station,
pallet raising means for lifting a pallet located at the station to bring said upper registration surface areas of the base member into contact with said fixed vertical contacts,
fixed horizontal contacts adapted to be contacted by the vertical side registration surface area of the base member of a pallet located at the station to locate the pallet in predetermined horizontal alignment in one direction with respect to the station, a movable horizontal contact member adapted to engage the slot in the base member of a pallet located at the station and mate with said converging vertical registration surface areas and adapted to move the pallet horizontally to bring said vertical side registration surface area of the base member into contact with said fixed horizontal contacts thereby locating the pallet in fixed position in a horizontal plane with respect to the station, and vertical positioning means for overcoming said vertical holding means and moving said holder vertically with respect to the base member to position the article at a predetermined vertical level with respect to the horizontal upper registration surface areas; and a work station having a work area and including fixed vertical contacts adapted to be contacted by the horizontal upper registration surface areas of the base member of a pallet located at the station to locate the pallet at a predetermined vertical level with respect to the work area of the station, pallet raising means for lifting a pallet located at the station to bring said upper registration surface areas of the base member into contact with said fixed vertical contacts, fixed horizontal contacts adapted to be contacted by the vertical side registration surface area of the base member of a pallet located at the station to locate the pallet in predetermined horizontal alignment in one direction with respect to the work area of the station, and a movable horizontal contact member adapted to engage the slot in the base member of a pallet located at the station and mate with said converging vertical registration surface areas and adapted to move the pallet horizontally to bring said vertical side registration surface area of the base member into contact with said fixed horizontal contacts thereby locating the pallet in fixed position in a horizontal plane with respect to the station whereby the article positioned at a predetermined vertical level with respect to said horizontal upper registration surface areas and in predetermined horizontal alignment with respect to said vertical side registration surface area and said converging vertical registration surface areas is located at a predetermined vertical level and in predetermined horizontal alignment with respect to the work area.

5. Apparatus for conveying a plurality of pallets along a path including in combination a track for supporting pallets and adapted to permit movement of pallets therealong, means for periodically advancing pallets along the track from the beginning of the track to the end of the track in increments of a predetermined distance, pallet removal means adjacent the end of the track for removing pallets from the track, pallet loading means adjacent the beginning of the track for placing pallets on the track, and continuously operating pallet conveying means for transferring pallets from the pallet removal means to the pallet loading means.

6. Apparatus for conveying a plurality of pallets along a path including in combination a main track for supporting a quantity of pallets in end-to-end relationship, means for periodically advancing pallets along the main track from the beginning of the track to the end of the track in increments of distance equal to the length of a pallet, a continuously operating removal conveyor adjacent the end of the main track adapted to engage the pallet located at the end of the main track and remove the pallet from the main track, a continuously operating return conveyor adjacent the beginning of the main track adapted to engage a pallet and convey the pallet to the beginning of the main track, a continuously operating return track for conveying pallets from the removal conveyor to the return conveyor, means adjacent the removal conveyor and the return track for disengaging pallets from the removal conveyor and transferring them to the return track, means adjacent the return track and the return conveyor for transferring pallets from the return track into engagement with the return conveyor, and means adjacent the return conveyor and the beginning of the main track for disengaging pallets from the return conveyor and transferring them to the main track.

7. Apparatus for conveying a plurality of pallets along a path including in combination a main track for supporting a quantity of pallets in end-to-end relationship in a straight line, pallet indexing means for advancing the pallets along the main track a distance equal to the length of a pallet during the index period of each operating cycle of the apparatus and permitting the pallet to remain stationary during the dwell period of each operating cycle of the apparatus, a main track loading gate at the beginning of the main track, a pallet removing position at the end of the main track, a continuously operating pallet return conveyor adapted to convey a pallet into said loading gate during the dwell period of each operating cycle, means at said loading gate for transferring a pallet from the return conveyor to the main track, a continuously operating pallet removing conveyor adapted to remove a pallet from the pallet removing position during the dwell period of each operating cycle, a continuously operating return track having its beginning adjacent the pallet removing conveyor and having its end adjacent the pallet return conveyor for conveying pallets from the pallet removing conveyor to the pallet return conveyor, means at the beginning of said return track for transferring pallets from the removing conveyor to the return track, and a transfer gate at the end of said return track for transferring pallets from the return track to the return conveyor.

8. Apparatus for establishing the location of a surface of an article including in combination a pallet comprising a base member, a holder movable with respect to the base member and adapted to receive an article, and holding means for maintaining the holder in position with respect to the base member;

sensing means adapted to provide an output signal responsive to the distance between the sensing means and a surface;

support means for supporting said pallet with a surface of an article in said holder in proximity to the sensing means;

a holder advancing member for contacting the holder of a pallet supported by said support means and adapted to be moved in the direction toward the sensing means overcoming the holding means and moving the holder toward the sensing means;

driving means for moving a driving member in the direction toward the sensing means; and connecting means for coupling the driving member to the holder advancing member, said connecting means being adapted to uncouple the driving means from the holder advancing member in response to a predetermined output signal from the sensing means.

9. Apparatus for locating a surface of an article at a predetermined vertical level including in combination
a pallet comprising
a base member,
a holder movable along its vertical axis with respect to the base member and adapted to receive an article at its upper surface, and
friction means for maintaining the holder in position along its vertical axis with respect to the base member;
sensing means adapted to provide an electrical output signal in response to the location of a surface at a distance greater than a predetermined distance from the sensing head of the sensing means;
support means for supporting said pallet with an upper surface region of an article in said holder under the sensing head of the sensing means;
a holder push-up member adapted to contact the under surface of the holder of a pallet supported by said support means and adapted to be moved vertically upward to overcome the friction means and move the holder vertically upward toward the sensing head of the sensing means;
a driving member located below the holder push-up member and adapted to be moved vertically;
continuously operated driving means for moving the driving member vertically upward; and
an electrically energized solenoid mounted between the driving member and the holder push-up member and electrically connected to the sensing means,
said solenoid having a retractable member and providing a rigid connection between the driving member and the holder push-up member while the solenoid is energized by an electrical output signal from the sensing means and the retractable member is advanced, and being adapted to withdraw the retractable member in the absence of an electrical output signal from the sensing means thereby uncoupling the driving member from the holder push-up member.

10. Apparatus for locating a surface of an article at a predetermined vertical level including in combination
a pallet comprising
a base member having a horizontal upper registration surface area,
a holder movable along its vertical axis with respect to the base member and adapted to receive an article at its upper surface, and
friction means for maintaining the holder in position along its vertical axis with respect to the base member;
sensing means adapted to provide an electrical output signal in response to the location of a surface at a distance greater than a predetermined distance from the sensing head of the sensing means;
support means for supporting said pallet with the horizontal upper registration surface area of the base member at a predetermined vertical level with respect to the sensing head of the sensing means and with an upper surface region of an article in said holder under the sensing head;
a holder push-up member adapted to contact the under surface of the holder of a pallet supported by said support means and adapted to be moved vertically upward to overcome the friction means and push the holder and article vertically upward toward the sensing head of the sensing means;
a driving member located below the holder push-up member and adapted to be moved vertically upward;
an electrically energized solenoid mounted on the driving member and electrically connected to the sensing means,
said solenoid having a member adapted to be advanced vertically upward providing a rigid connection between the solenoid and the push-up member while the solenoid is energized by an electrical output signal from the sensing means, and being adapted to be retracted vertically downward a predetermined distance in the absence of an electrical output signal from the sensing means thereby uncoupling the solenoid from the push-up member; and
driving means for moving the driving member upward a predetermined distance;
the predetermined distance the solenoid member is retracted being greater than the distance the driving means moves the driving member upward subsequent to movement of the upper surface region of the article to the predetermined distance from the sensing head and consequent termination of the electrical output signal from the sensing means.

11. Apparatus for locating an article in a predetermined position including in combination
a pallet comprising
a base member,
a holder movable in a horizontal plane with respect to the base member and adapted to receive an article, and
releasable fastening means for maintaining the holder in fixed position in a horizontal plane with respect to the base member;
support means for supporting said pallet in fixed position;
means for releasing said fastening means to permit movement of the holder with respect to the base member and for securing said fastening means to maintain the holder in fixed position in a horizontal plane with respect to the base member; and
horizontal positioning means adapted to engage the holder and adapted to be manually operable to move the holder in a horizontal plane with respect to the base member while said fastening means are released and to position the article in predetermined horizontal alignment with respect to the base member.

12. Apparatus for locating an article in a predetermined position including in combination
a pallet comprising
a base member having a vertical side registration surface area on one side and a slot on the opposite side defined by converging vertical registration surface areas,
a holder movable in a horizontal plane with respect to the base member and adapted to receive an article, and
releasable fastening means for maintaining the holder in fixed position in a horizontal plane with respect to the base member;
support means including locating means for supporting said pallet with the vertical side registration surface area and the converging vertical registration surface areas in predetermined horizontal alignment with respect to the support means;
gripping means adapted to engage the fastening means of a pallet supported by said support means;
means for operating said gripping means to release said fastening means and permit movement of the holder with respect to the base member;
horizontal positioning means adapted to engage the holder and adapted to be manually operable to move the holder in a horizontal plane with respect to the base member while said fastening means are released and to position the article in predetermined horizontal alignment with respect to the base member; and
means for operating said gripping means to secure said fastening means and maintain the holder in fixed position in a horizontal plane with respect to the base member.

13. Motion transmitting apparatus including in combination a fixed support, a movable plate mounted on the fixed support and adapted to be moved with respect to the fixed support in the plane of the plate, a shaft having its axis generally parallel to the plane of the plate and mounted for axial and rotational movement, a connecting plate, a first strip of a material which is rigid to forces acting parallel to the major surfaces of the strip and flexible to forces acting normal to the major surfaces of the strip having one edge portion along the length of the strip fixed to the outer surface of the shaft and parallel to the axis of the shaft and having the opposite edge portion along the length of the strip fixed to the connecting plate, a second strip of a material which is rigid to forces acting parallel to the major surfaces of the strip and flexible to forces acting normal to the major surfaces of the strip having one edge portion along the length of the strip fixedly connected to the movable plate and parallel to the plane of the plate and having the opposite edge portion along the length of the strip fixed to the connecting plate, means for imparting limited linear axial movement and limited rotational movement to the shaft whereby linear movement of the shaft is transmitted as linear movement to the movable plate in the direction parallel to the axis of the shaft by means of the first strip, the connecting plate, and the second strip, and rotational movement of the shaft is translated into linear movement of the movable plate in the direction normal to the axis of the shaft by means of the first strip, the connecting plate, and the second strip.

14. Motion transmitting apparatus including in combination a fixed support, a movable member having a plate, means mounting the plate on the fixed support and permitting limited movement in the plane of the plate whereby the movable member is adapted to be moved with respect to the fixed support parallel to the plane of the plate, a shaft having its axis generally parallel to the plane of the plate and mounted for axial and rotational movement with respect to the fixed support, a connecting plate disposed between the shaft and the movable member having one end thereof adjacent the shaft and having the opposite end thereof adjacent the movable member, a first strip of a material which is rigid to forces acting parallel to the major surfaces of the strip and flexible to forces acting normal to the major surfaces of the strip having one edge portion along the length of the strip fixed to the outer surface of the shaft and parallel to the axis of the shaft and having the opposite edge portion along the length of the strip fixed to the connecting plate at said one end thereof.

a second strip of a material which is rigid to forces acting parallel to the major surfaces of the strip and flexible to forces acting normal to the major surfaces of the strip having one edge portion along the length of the strip fixed to the movable member and parallel to the axis of the shaft and having the opposite edge portion along the length of the strip fixed to the connecting plate at said opposite end thereof, a vertical yoke having two arms extending on opposite sides of said shaft adjacent one end of the shaft, a first pivot connection between each arm of the vertical yoke and the shaft, the axes of the pivots lying on a line which intersects the axis of the shaft, a horizontal yoke having two arms extending on opposite sides of said vertical yoke, a second pivot connection between each arm of the horizontal yoke and the vertical yoke, the axes of the second pivots lying on a line which is parallel to and displaced from the line of the axes of the first pivots, mounting means supporting the horizontal yoke and permitting rotation thereof about an axis coaxial with the axis of the shaft while preventing linear movement thereof with respect to the fixed support, a control handle fixed to the vertical yoke intermediate the arms of the vertical yoke whereby movement of the handle in a direction parallel to the axis of the shaft rotates the vertical yoke about the second pivot connections with respect to the horizontal yoke causing linear movement of the first pivot connection and the shaft along the axis of the shaft, the linear movement of the shaft being transmitted as linear movement to the movable member in the direction parallel to the axis of the shaft by means of the first strip, the connecting plate, and the second strip, and whereby movement of the handle in a direction normal to the axis of the shaft rotates the vertical yoke, horizontal yoke, and shaft which remain fixed with respect to each other about the axis of the shaft, the rotational movement of the shaft being translated into linear movement of the movable member in the direction normal to the axis of the shaft by means of the first strip, the connecting link, and the second strip.

References Cited

UNITED STATES PATENTS 3,271,555   9/1966   Hirshon _____ 228—47
3,106,856   10/1963   Jones _____ 228—1

RICHARD H. EANES, JR., *Primary Examiner.*